US012757188B2

(12) United States Patent
Bagheri et al.

(10) Patent No.: US 12,757,188 B2
(45) Date of Patent: Oct. 6, 2026

(54) METHOD AND APPARATUS FOR MANAGING A MINIMUM SCHEDULING OFFSET FOR ONE OR MORE BANDWIDTH PARTS

(71) Applicant: Lenovo (Singapore) Pte. Ltd., New Tech Park (SG)

(72) Inventors: Hossein Bagheri, Urbana, IL (US); Vijay Nangia, Woodridge, IL (US); Hyejung Jung, Northbrook, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 489 days.

(21) Appl. No.: 17/634,896

(22) PCT Filed: Aug. 17, 2020

(86) PCT No.: PCT/IB2020/057744

§ 371 (c)(1),
(2) Date: Feb. 11, 2022

(87) PCT Pub. No.: WO2021/028892

PCT Pub. Date: Feb. 18, 2021

(65) Prior Publication Data

US 2022/0312440 A1 Sep. 29, 2022

Related U.S. Application Data

(60) Provisional application No. 62/887,598, filed on Aug. 15, 2019.

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0051* (2013.01); *H04W 72/044* (2013.01); *H04W 72/23* (2023.01)

(58) Field of Classification Search
CPC ........... H04W 72/1263; H04W 72/044; H04W 72/23; H04W 72/0453; H04W 72/12;
(Continued)

(56) References Cited

U.S. PATENT DOCUMENTS

2020/0313831 A1* 10/2020 Kim ...................... H04W 72/23
2020/0351955 A1* 11/2020 Jeon ...................... H04W 80/02
(Continued)

FOREIGN PATENT DOCUMENTS

JP WO-2020008646 A1 * 9/2020 ........... H04W 24/10

OTHER PUBLICATIONS

PCT International Search Report for PCT/IB2020/057744, Lenovo (Singapore) Pte. Ltd., mailing date—Oct. 30, 2020.
(Continued)

*Primary Examiner* — Ricky Q Ngo
*Assistant Examiner* — David M Kayal
(74) *Attorney, Agent, or Firm* — FIG. 1 Patents

(57) ABSTRACT

A method and apparatus are provided for managing a minimum scheduling offset for one or more bandwidth parts. A configuration for a set of one or more preconfigured minimum scheduling offset values are received (502) for a particular bandwidth part of a cell. A default minimum scheduling offset for the particular bandwidth part of the cell, that is selected from the one or more preconfigured minimum scheduling offset values of the received configuration is determined (504). The particular bandwidth part is switched (506) to from another bandwidth part. The determined default minimum scheduling offset for the particular bandwidth part is applied (508). For the particular band-
(Continued)

width part, a time gap between a scheduling of a transmission for the user equipment and a physical downlink control channel in unit of slots is equal to or larger than the default minimum scheduling offset (510).

20 Claims, 6 Drawing Sheets

(51) Int. Cl.
*H04W 72/044* (2023.01)
*H04W 72/23* (2023.01)
(58) Field of Classification Search
CPC .... H04W 72/04; H04W 52/00; H04L 5/0051; Y02D 30/70
See application file for complete search history.

(56) References Cited

U.S. PATENT DOCUMENTS

| | | | | |
|---|---|---|---|---|
| 2021/0050985 | A1* | 2/2021 | Ang | H04W 72/23 |
| 2021/0321446 | A1* | 10/2021 | Lee | H04W 72/0446 |
| 2021/0352708 | A1* | 11/2021 | Seo | H04W 52/0216 |
| 2022/0030562 | A1* | 1/2022 | Yi | H04W 76/28 |
| 2022/0104222 | A1* | 3/2022 | Ahn | H04L 5/0051 |
| 2022/0240187 | A1* | 7/2022 | Guo | H04W 52/0229 |
| 2022/0360973 | A1 | 11/2022 | Zhu et al. | |
| 2023/0075276 | A1 | 3/2023 | Zhu et al. | |
| 2023/0100253 | A1 | 3/2023 | Zhu et al. | |
| 2023/0232211 | A1 | 7/2023 | Hong | |
| 2023/0232213 | A1 | 7/2023 | Hong | |
| 2023/0337230 | A1* | 10/2023 | Ang | H04L 5/0044 |
| 2025/0031030 | A1 | 1/2025 | Kwon et al. | |
| 2025/0048085 | A1 | 2/2025 | Wang et al. | |
| 2025/0106650 | A1 | 3/2025 | Kumar et al. | |
| 2025/0310214 | A1 | 10/2025 | Ly et al. | |
| 2025/0350962 | A1 | 11/2025 | Soni et al. | |
| 2025/0392523 | A1 | 12/2025 | Estevez et al. | |
| 2026/0075408 | A1 | 3/2026 | Wirth et al. | |

OTHER PUBLICATIONS

3GPP TS 36.101 V15.7.0 (Jun. 2019), 3rd Generation Partnership Project; Technical Specification Group Radio Access Network; Evolved Universal Terrestrial Radio Access (E-UTRA); User Equipment (UE) radio transmission and reception (Release 15).
3GPP TS 36.213 V15.6.0 (Jun. 2019), 3rd Generation Partnership Project; Technical Specification Group Radio Access Network; Evolved Universal Terrestrial Radio Access (E-UTRA); Physical layer procedures (Release 15).
3GPP TS 36.300 V15.6.0 (Jun. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15).
3GPP TS 36.321 V15.6.0 (Jun. 2019), 3rd Generation Partnership Project; Technical Specification Group Radio Access Network; Evolved Universal Terrestrial Radio Access (E-UTRA); Medium Access Control (MAC) protocol specification (Release 15).
3GPP TS 38.101-1 V15.6.0 (Jun. 2019), 3rd Generation Partnership Project; Technical Specification Group Radio Access Network; NR; User Equipment (UE) radio transmission and reception; Part 1: Range 1 Standalone (Release 15).
3GPP TS 38.101-2 V15.6.0 (Jun. 2019), 3rd Generation Partnership Project; Technical Specification Group Radio Access Network; NR; User Equipment (UE) radio transmission and reception; Part 2: Range 2 Standalone (Release 15).
3GPP TS 38.101-3 V15.6.0 (Jun. 2019), 3rd Generation Partnership Project; Technical Specification Group Radio Access Network; NR; User Equipment (UE) radio transmission and reception; Part 3: Range 1 and Range 2 Interworking operation with other radios (Release 15).
3GPP TS 38.133 V15.6.0 (Jun. 2019), 3rd Generation Partnership Project; Technical Specification Group Radio Access Network; NR; Requirements for support of radio resource management (Release 15).
3GPP TS 38.211 V15.6.0 (Jun. 2019), 3rd Generation Partnership Project; Technical Specification Group Radio Access Network; NR; Physical channels and modulation (Release 15).
3GPP TS 38.212 V15.6.0 (Jun. 2019), 3rd Generation Partnership Project; Technical Specification Group Radio Access Network; NR; Multiplexing and channel coding (Release 15).
3GPP TS 38.213 V15.6.0 (Jun. 2019), 3rd Generation Partnership Project; Technical Specification Group Radio Access Network; NR; Physical layer procedures for control (Release 15).
3GPP TS 38.214 V15.4.0 (Dec. 2018), 3rd Generation Partnership Project; Technical Specification Group Radio Access Network; NR; Physical layer procedures for data (Release 15).
3GPP TS 38.321 V15.6.0 (Jun. 2019), 3rd Generation Partnership Project; Technical Specification Group Radio Access Network; NR; Medium Access Control (MAC) protocol specification (Release 15).
3GPP TS 38.331 V15.6.0 (Jun. 2019), 3rd Generation Partnership Project; Technical Specification Group Radio Access Network; NR; Radio Resource Control (RRC) protocol specification (Release 15).
3GPP TR 38.840 V16.0.0 (Jun. 2019), 3rd Generation Partnership Project; Technical Specification Group Radio Access Network; NR; Study on User Equipment (UE) power saving in NR (Release 16).
3GPP TR 38.913 V15.0.0 (Jun. 2018), 3rd Generation Partnership Project; Technical Specification Group Radio Access Network; Study on Scenarios and Requirements for Next Generation Access Technologies; (Release 15).
Nokia et al., "On remaining aspects of NR CA/DC and BWPs", R1-1715755, for 3GPP TSG RAN WG1 Meeting NRAH#3, Nagoya, Japan, Sep. 18-21, 2017.
Qualcomm Incorporated, "Open Issues on BWP", R1-1720693, for 3GPP TSG RAN WG1 #91, Reno, NV, USA, Nov. 27-Dec. 1, 2017.
Huawei et al., "Procedures of cross-slot scheduling for UE power saving", R1-1906006, for 3GPP TSG RAN WG1 #97, Reno, USA, May 13-17, 2019.
Qualcomm Incorporated, "Cross-slot scheduling power saving techniques", R1-1907295, for 3GPP TSG RAN WG1 #97, Reno, USA, May 13-17, 2019.
Apple Inc., "Cross Slot Scheduling for UE Power Saving", R1-1907346, for 3GPP TSG RAN WG1 #97, Reno, USA, May 13-17, 2019.
Media Tek Inc., "Summary of Cross-slot Scheduling Power-Saving Techniques", R1-1907918, for 3GPP TSG RAN WG1 Meeting #97, Reno, USA, May 13-17, 2019.
Catt et al., "New WID: UE Power Saving in NR", RP-190727, for 3GPP TSG RAN Meetings #83, Shenzhen, China, Mar. 18-21, 2019.
20761325.8 , "Communication Pursuant to Article 94(3) EPC", Aug. 9, 2024, 10 pages.
Intel Corporation , "Considerations on PDCCH-based power saving signal", 3GPP TSG-RAN WG1 #97, R1-1906819, Reno, USA, May 2019, 10 pages.
"Foreign Office Action", Chinese Application No. 202080057137.4, Jul. 23, 2025, 8 pages.
Non-Final Office Action issued in U.S. Appl. No. 18/659,568, mailed May 5, 2026, 12 pages.
Non-Final Office Action issued in U.S. Appl. No. 18/659,654, mailed May 12, 2026, 20 pages.

* cited by examiner

METHOD AND APPARATUS FOR MANAGING A MINIMUM SCHEDULING OFFSET FOR ONE OR MORE BANDWIDTH PARTS

FIELD OF THE INVENTION

The present disclosure is directed to a method and apparatus for managing a minimum scheduling offset for one or more bandwidth parts, including maintaining a default minimum scheduling offset for each of one or more bandwidth parts, which can be used to enable enhanced energy efficiencies and/or power saving aspects.

BACKGROUND OF THE INVENTION

Presently, user equipment, such as wireless communication devices, communicate with other communication devices using wireless radio frequency signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

An enhanced battery life can be a desirable aspect of the user experience. Generally, the longer a device can be used between the time required for recharging the batteries, the happier a user will be. In order to enhance the battery life, one might increase the overall battery capacity or reduce the rate at which the stored energy stored within the battery is used. Historically, in at least some operating modes, a device may be able to reduce power consumption by identifying various periods of time during which at least some portions of the circuitry may be at least temporarily disabled.

In at least some instances, there may be occasions during which the transmission and/or reception of radio frequency signals may not be immediately necessary. During these instances, it may be possible to disable at least some of the circuitry related to the transmission and/or receipt of a wireless signal. Because a device may not always need to send and/or receive information, a device will sometimes monitor a paging channel, which identifies when an incoming communication for the device can be expected. Depending upon the identified time at which an incoming communication has been identified as being expected, the device can make provisions for the necessary supporting circuitry to be activated in anticipation of the incoming communication. In some instance, there is a delay between when a paging message is received and the time that it takes to identify the details related to an anticipated incoming communication. During this time it may be necessary to buffer the received radio signal, such that when the details of the incoming communication are known, the device can identify the particular portion of the received radio signal that has been buffered that is of interest to the user, if it is possible that the actual transmission could occur before the associated details have been decoded. Because it may not be known in advance which portion of the to be received radio communication may be of interest prior to the processing of the associated paging message, a device could sometimes buffer the signal until it is known with greater specificity what portion of the incoming signal is of interest.

The present inventors have recognized that by providing a managed minimum delay in the transmission of the message associated with the earlier received paging message/control channel scheduling an incoming signal such as one containing downlink data, until after the time necessary for decoding the paging message, it may be possible to avoid buffering the incoming signal, and just wait for the identified instance in which the incoming message is expected, so as to begin monitoring the associated bandwidth portion and/or corresponding search space at that time. Up until this time, it may be possible to disable at least some portions of the wireless radio communication circuitry, which may have a beneficial effect on the rate at which power is consumed within the device. In some instances a default minimum offset value may be used to help better ensure that the transmission of the corresponding message is delayed until at least after the time expected to be needed for decoding the associated paging message, which has been previously received. Correspondingly, the device will then know when it needs to wake up prior to and/or in advance of the actual transmission of the expected message without fear that the message could arrive prior to knowing the actual expected time of arrival. In some instances, it may be desirable to manage different default minimum offset values for different bandwidth portions and/or different search spaces within a bandwidth portion.

SUMMARY

The present application provides a method in a user equipment. The method includes receiving for a particular bandwidth part of a cell a configuration for a set of one or more preconfigured minimum scheduling offset values. A default minimum scheduling offset for the particular bandwidth part of the cell, that is selected from the one or more preconfigured minimum scheduling offset values of the received configuration is determined. The method further includes switching to the particular bandwidth part from another bandwidth part. The determined default minimum scheduling offset for the particular bandwidth part is applied. For the particular bandwidth part, a time gap between a scheduling of a transmission for the user equipment and a physical downlink control channel in unit of slots is equal to or larger than the default minimum scheduling offset.

According to another possible embodiment, a user equipment is provided. The user equipment includes a transceiver that receives for a particular bandwidth part of a cell a configuration for a set of one or more preconfigured minimum scheduling offset values. The user equipment further includes a controller that determines a default minimum scheduling offset for the particular bandwidth part of the cell, that is selected from the one or more preconfigured minimum scheduling offset values of the received configuration, and switches to the particular bandwidth part from another bandwidth part. The determined default minimum scheduling offset is applied for the particular bandwidth part. For the particular bandwidth part, a time gap between a scheduling of a transmission for the user equipment and a physical downlink control channel in unit of slots is equal to or larger than the default minimum scheduling offset.

According to a further possible embodiment, a method in a network entity is provided. The method includes transmitting for a particular bandwidth part of a cell a configuration for a set of one or more preconfigured minimum scheduling offset values from which a default minimum scheduling offset for the particular bandwidth part of the cell is determined, that is selected from the one or more preconfigured minimum scheduling offset values of the transmitted configuration. As part of switching to the particular bandwidth part from another bandwidth part, the determined default minimum scheduling offset is applied for the particular bandwidth part. For the particular bandwidth part, a time gap between a scheduling of a transmission for the user equipment and a physical downlink control channel in unit of slots is equal to or larger than the default minimum scheduling offset.

According to a still further possible embodiment, a network entity is provided. The network entity includes a controller, and a transceiver that transmits for a particular bandwidth part of a cell a configuration for a set of one or more preconfigured minimum scheduling offset values. A default minimum scheduling offset is determined for the particular bandwidth part of the cell, that is selected from the one or more preconfigured minimum scheduling offset values of the received configuration, and switches to the particular bandwidth part from another bandwidth part. The determined default minimum scheduling offset is applied for the particular bandwidth part. For the particular bandwidth part, a time gap between a scheduling of a transmission for the user equipment and a physical downlink control channel in unit of slots is equal to or larger than the default minimum scheduling offset.

These and other features, and advantages of the present application are evident from the following description of one or more preferred embodiments, with reference to the accompanying drawings.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION OF THE PREFERRED EMBODIMENT(S)

Figure 1:
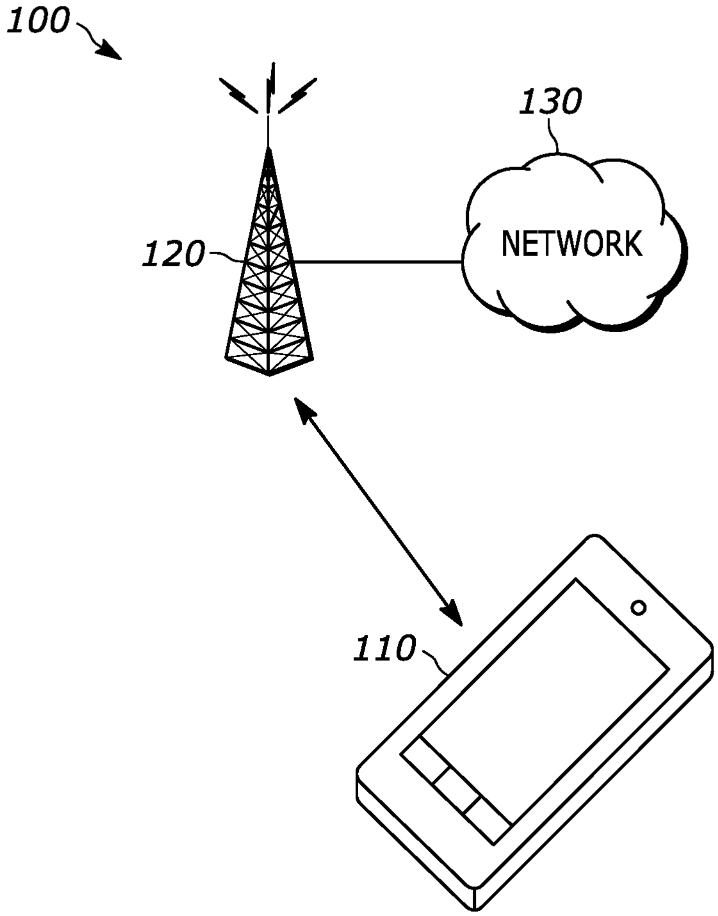
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide methods and apparatus for managing a minimum scheduling offset for one or more bandwidth parts.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

If a UE is not expected to receive/transmit over a time duration, it can go into a micro-sleep mode, wherein the UE can save power by going into a low power state (such as in the radio frequency (RF) and front-end circuit portions and/or in other modem hardware). The UE can extend the micro-sleep duration if the UE knows that the physical downlink shared channel (PDSCH) corresponding to a physical downlink control channel (PDCCH) (containing scheduling downlink control information (DCI)) will not start before finishing decoding of the PDCCH via avoiding unnecessary buffering of orthogonal frequency division multiplexing (OFDM) symbols (such as for potential PDSCH) after PDCCH is received but before PDCCH is decoded. For instance, micro-sleep duration can be extended if the PDSCH corresponding to the PDCCH (containing scheduling DCI) in slot 'n', will occur in slot 'n+k0' (referred to as cross-slot scheduling), where k0>0 for all k0 values in the associated time-domain resource allocation (TDRA) table (such as Table 5.1.2.1.1-2 in TS 38.214). The minimum K0 value can be decided by the network based on some UE feedback/assistance (such as UE capability signaling) as power saving is highly related to UE implementation, and may be different for different subcarrier spacings (SCS).

Once the UE goes to the power saving mode (extended micro-sleep for example) in case of a traffic burst, it may be beneficial to avoid scheduling delays, such as via switching back to same-slot scheduling from cross-slot scheduling. One way to realize dynamic switching between power saving mode and non-power saving mode (such as cross-slot scheduling vs. same-slot scheduling) is to indicate min K0 (explicitly or implicitly via indicating a subset of TDRA table entries or indicating different TDRA tables from a set of configured TDRA tables) in scheduling DCI.

Another technique to save power is UE adaptation to the number of multiple input multiple output (MIMO) layers or number of transmit/receive (Tx/Rx) antenna (panels) which for example can help save power during periods of low scheduling activity by reduced antenna operation. In one approach, gNB configures the maximum number of downlink (DL) MIMO layers, and the UE can choose to use 2Rx (receive) antenna or 4Rx antenna. In one example, if the maximum number of DL MIMO layers is 2, the UE may use 2Rx or 4Rx based on the received signal to noise ratio (SINR), and if the maximum number of DL MIMO layers is 4, 4Rx antenna ports can be used by the UE.

In Rel-15, the maximum number of DL MIMO layers can be configured per UE per cell (UE capability information element MIMO-LayersDL as defined in TS 38.331). Similarly, the maximum number of UL MIMO layers can be configured per UE per cell (UE capability information element MIMO-LayersUL as defined in TS 38.331). To enable UE adaptation to the number of MIMO layers, for Rel-16 3GPP, it was agreed to support configuration of a different MIMO layer configuration of the initial/default BWP compared with other bandwidth parts (BWPs) of a Serving Cell. Therefore, the maximum number of DL/UL MIMO layers can be configured per UE per BWP or group of BWPs (one group can be the initial/default BWP and the other group can be other BWPs of the cell) instead of per cell.

Correspondingly methods are provided, which 1) enable power saving via adaptation of cross-slot scheduling or via adaptation of maximum number of MIMO layers in different scenarios including aperiodic sounding reference signal (SRS); and
2) take into account the effect of power savings via adaptation of cross-slot scheduling or via adaptation of maximum number of MIMO layers on different procedures including power headroom report (PHR), ultra-reliable low-latency communication (URLLC) operation.

In detail, the following is disclosed:

1) PHR cut-off time relaxation in case of power saving via cross-slot scheduling;
2) details of K0_min/K2_min definition (e.g., defined per BWP group) and derivation (e.g., in case of BWP switching);

limitations of power saving via BWP switching (e.g., for maximum MIMO layer adaptation) on a first serving cell in case a second serving cell is configured for URLLC operation; and Details of power saving via cross-slot scheduling for aperiodic SRS, including
- derivation of minimum applicable value of aperiodic SRS triggering offset, and
- determining number of SRS ports in case of antenna switching considering the limitations on maximum number of MIMO layers defined for a BWP to enable power saving via adapting maximum number of MIMO layers.

It is noted that power saving is also applicable for other signals instead of PDSCH (e.g., similar arguments as above may be applicable for avoiding unnecessary buffering of aperiodic CSI-RS or fast PDCCH processing/signal preparation for physical uplink shared channel (PUSCH)/SRS, etc.).

Power Saving Via Cross-Slot Scheduling

A UE power saving study item was finished in technical report (TR) 38.840 entitled "Study on UE Power Saving in New Radio", and corresponding work item description (WID) was approved in RP-190727, similarly titled. One element of the work item was to enhance cross-slot scheduling operation to enable power savings. Cross-slot scheduling is already possible in Rel-15 via PDSCH time-domain resource allocation (TDRA) tables defined in TS 38.214 (Tables 5.1.2.1.1-2-4). In particular, a TDRA table (containing up to 16 TDRA patterns) per BWP is configured by RRC signaling, and scheduling DCI indicates which entry of the TDRA table is applicable to the scheduled PDSCH. Each entry of the TDRA table is composed of three fields: K0, PDSCH mapping type, and StartSymbolAndLength.

- K0 is the time gap between PDCCH and PDSCH in unit of slots (i.e., K0=0 implies same-slot scheduling, and K0>0 implies cross-slot scheduling);
- mapping type refers to the mapping of the PDSCH: PDSCH-mapping-type-A (also referred to as slot based) or PDSCH-mapping-type-B (also known as mini-slot based); and
- startSymbolAndLength indicates the starting symbol index and duration of PDSCH within a slot.

Figure 2:
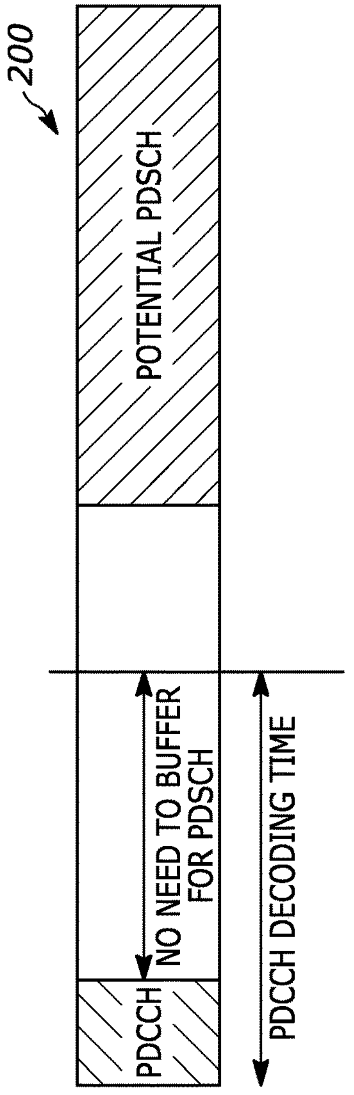
FIG. 2 is an overlapping transmission timing diagram for a physical downlink control channel and a physical downlink shared channel.

Cross-slot scheduling can be supported by configuring a TDRA table with the minimum K0>0 (or by indication of minimum K0 (referred to K0_min) to be larger than zero and using subset of TDRA table with K0>=K0_min). Then the UE can avoid unnecessary PDSCH buffering while PDCCH is being decoded leading to power saving as shown in FIG. 2. More specifically, FIG. 2 illustrates an overlapping transmission timing diagram 200 for a physical downlink control channel and a physical downlink shared channel, where if the UE knows K0>0 before PDCCH decoding, there may be no need to perform unnecessary PDSCH buffering while PDCCH is being decoded.

From a latency perspective, same-slot scheduling (or in general having no/small gap between PDCCH and PDSCH) is desired; so in case of a DL traffic burst, it may be useful to switch back to same-slot scheduling from cross-slot scheduling. To avoid delay due to RRC reconfiguration signaling (between cross slot scheduling and same slot scheduling), it has been proposed to use dynamic signaling to determine minimum K0 value as captured by the following related agreements in 3 GPP:

Agreements:

For an active DL and an active UL BWP, a UE can be indicated via signaling(s) from gNB to adapt the minimum applicable value(s) of K0, K2 and/or aperiodic CSI-RS triggering offset (with/without QCL_typeD configured) where the signaling type is to be down-selected from:
- Alt 1: MAC-CE based
- Alt 2: L1 based FFS: How to determine the minimum applicable value if explicit value is not provided.

Agreements:

Possible candidate indication methods to adapt the minimum applicable value of K0 (or K2) for an active DL (or UL) BWP, where the indication method is to be selected from:
- Alt 1: Indication of a subset of TDRA entries, e.g., bit-map based indication
- Alt 2: Indication of one active table from multiple configured TDRA tables
- Alt 3: Indication of the minimum applicable value
- Note: Other option is not precluded
- Note: PDCCH monitoring case 1-1 is prioritized for the design.

FFS: Whether and how the minimum applicable K0 (or K2) value of the active DL (or UL) BWP is also applied to cross-BWP scheduling Agreements:

Possible candidate indication methods to adapt the minimum applicable value of the aperiodic CSI-RS triggering offset for an active DL BWP, where the indication method is to be selected from:

Alt 1: Implicit indication by defining the minimum applicable value the same as the minimum applicable K0 value when indicated Alt 2: Indication of the minimum applicable value Note: Other option is not precluded Note: PDCCH monitoring case 1-1 is prioritized for the design.

Agreements:

The adaptation on the minimum applicable value of K0 does not apply to at least the following cases:

| radio network temporary identifier (RNTI) | PDCCH search space |
|---|---|
| SI-RNTI | Type0 common |
| SI-RNTI | Type0A common |
| RA-RNTI, TC-RNTI | Type1 common |
| P-RNTI | Type2 common |

Agreements:

Regarding aperiodic CSI-RS triggering, at least if a UE is operated with cross-slot scheduling based power saving, If all the associated trigger states do not have the higher layer parameter qcl-Type set to 'QCL-TypeD' in the corresponding TCI states and the PDCCH SCS is equal to the CSI-RS SCS, specification allows the aperiodic CSI-RS triggering offset to be set to a non-zero value.

Agreements:

For an active DL and an active UL BWP, a UE can be indicated via L1-based signaling(s) from gNB to adapt the minimum applicable value(s) of K0, K2 and/or aperiodic CSI-RS triggering offset (with/without QCL_typeD configured).

Agreements:

To adapt the minimum applicable value of K0 (K2) for an active DL (UL) BWP, indication of the minimum applicable value is supported.

for further study (FFS): Direct assignment of the minimum application value, indication of one value from one or multiple preconfigured or predetermined value (s), and/or implicit indication.

FFS: How the indicated minimum applicable value is applied to the selection of a DL (UL) TDRA entry. Example directions include at least the following:

Excluding the invalid TDRA entries

Re-interpret the selected K0 (K2) value

Agreements:

At least for the L1-based adaptation on the minimum applicable value of K2, it does not apply to PUSCH scheduled by medium access control (MAC) random access response (RAR) for at least contention-based random access channel (RACH) procedure.

FFS: Exclude contention-free RACH

FFS: Exclude PUSCH scheduled with TC-RNTI

Agreements:

To adapt the minimum applicable value of the aperiodic CSI-RS triggering offset for an active DL BWP, implicit indication by defining the minimum applicable value the same as the minimum applicable K0 value when indicated is supported.

Agreements:

When UE is indicated of the minimum applicable value of K0 (K2) for an active DL (UL) BWP, the application method to the selection of a DL (UL) TDRA entry is to be decided from:

An entry in the active DL (UL) TDRA table with K0 (K2) value smaller than the indicated minimum is not expected by or not valid for the UE for the TDRA indication(s)

Agreements:

At least for the L1-based adaptation on the minimum applicable value of K2, it does not apply to:

PUSCH scheduled by RAR UL grants for contention-free RACH procedure

PUSCH scheduled with TC-RNTI

Companies are encouraged to check the following proposal for the application delay: For an active DL and an active UL BWP, when UE is indicated by L1-based signaling(s) in slot n to change the minimum applicable value(s) of K0 and/or K2, UE is not expected to apply the new indicated minimum applicable value(s) before slot $$\left\lceil (n+X)\cdot\frac{2^{\mu_{PDSCH}}}{2^{\mu_{PDCCH}}}\right\rceil$$

for K0, or slot $$\left\lceil (n+X)\cdot\frac{2^{\mu_{PDSCH}}}{2^{\mu_{PDCCH}}}\right\rceil$$

for K2, where

X=max(Y, Z)

Y is the minimum applicable K0 value prior to the indicated change

Z=[1]

Z is the smallest feasible non-zero application delay that may depend on DL SCS

FFS: Z>1 for 60 kHz/120 kHz SCS or multi-transmission reception point (TRP)

FFS: Cross-carrier scheduling with different numerologies

FFS: interruption time, if any

According to TS 38.214:

When the UE is scheduled to receive PDSCH by a DCI, the Time domain resource assignment field value m of the DCI provides a row index m+1 to an allocation table. The determination of the used resource allocation table is defined in sub-clause 5.1.2.1.1. The indexed row defines the slot offset $K_0$, the start and length indicator SLIV, or directly the start symbol S and the allocation length L, and the PDSCH mapping type to be assumed in the PDSCH reception.

Given the parameter values of the indexed row:

The slot allocated for the PDSCH is $$\left\lfloor n\cdot\frac{2^{\mu_{PDSCH}}}{2^{\mu_{PDCCH}}}\right\rfloor + K_0,$$

where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively, and The starting symbol S relative to the start of the slot, and the number of consecutive symbols L counting from the symbol S allocated for the PDSCH are determined from the start and length indicator SLIV:

if $(L-1)\leq 7$ then $SLIV=14\cdot(L-1)+S$ else $SLIV=14\cdot(14-L+1)+(14-1-S)$ where $0<L\leq 14-S$, and The PDSCH mapping type is set to Type A or Type B as defined in sub-clause 7.4.1.1.2 of [4, TS 38.211].

The UE shall Consider the S and L Combinations Defined in Table 5.1.2.1-1 as Valid PDSCH Allocations:

TABLE 5.1.2.1-1

| Valid S and L combinations | | | | | | |
|---|---|---|---|---|---|---|
| PDSCH mapping | Normal cyclic prefix | | | Extended cyclic prefix | | |
| type | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1
S = 3 is applicable only if dmrs-TypeA-Position = 3

Power Saving via Adaptation of Maximum Number of DL/UL MIMO Layers

Another element of the power saving work item is to specify the power saving techniques of UE adaptation to the maximum number of MIMO layers, including specifying configuration of a different MIMO layer configuration of the initial/default BWP compared with other BWPs of a Serving Cell. It was also proposed to discuss the case that per-BWP MIMO layer configuration is defined.

Power Headroom Report

Power headroom indicates the amount of transmission power left for a UE to use in addition to a hypothetical power required for the current transmission (the hypothetical power calculation does not take into account the limitation of maximum PCMAX,c,f).

Power Headroom Reporting in LTE

In order to assist the eNB to schedule uplink transmission resources to different UEs in an appropriate way, it is important that the user equipment reports its available power headroom (PH) to eNB. The eNB can determine how much more uplink bandwidth per sub-frame a user equipment is capable of using, i.e. how close the UE operates to its transmission power limits, based on a received power headroom report (PHR). The Power Headroom indicates the difference between the UE maximum uplink transmit power and the estimated power for UL-SCH transmission. For Rel-8/9 the UE power headroom in dB valid for sub-frame i is defined by:

$$PH(i)=P_{CMAX}-\{10\cdot\log_{10}(M_{PUSCH}(i))+P_{0\_PUSCH}(j)+\alpha(j)\cdot PL+\Delta_{TF}(i)+f(i)\}$$

$P_{CMAX}$ is the total maximum UE transmit power and is a value chosen by the user equipment in the given range of $P_{CMAX\_L}$ $P_{CMAX\_H}$ based on the following constraints:

$$P_{CMAX\_L}\leq P_{CMAX}\leq P_{CMAX\_H}$$

$$P_{CMAX\_L}=\min(P_{EMAX}-\Delta T_C, P_{PowerClass}-MPR-AMPR-\Delta T_C)$$

$$P_{CMAX\_H}=\min(P_{EMAX}, P_{PowerClass})$$

$P_{EMAX}$ is the value signaled by the network and ΔTC, maximum power reduction (MPR) and additional maximum power reduction (AMPR) are specified in 3GPP TS 36.101. The MPR is a power reduction value used to control the adjacent channel leakage power ratio (ACLR) associated with the various modulation schemes and the transmission bandwidth. AMPR is the additional maximum power reduction. It is a band specific value and applied by the UE when configured by the network.

The range of the power headroom report is from +40 to −23 dB. The negative part of the range enables the user equipment to signal to the eNB the extent to which it has received an UL grant which would require more transmission power than the UE has available. This would enable the eNB to reduce the amount of uplink resource in a subsequent grant (dynamic or semi-static), thus freeing up transmission resources which could be then allocated to other UEs.

A power headroom report, i.e. PHR MAC CE, can only be sent in a sub-frame for which UE has a valid uplink resource, i.e. PUSCH resource. The report relates to the sub-frame in which it is sent. The Power Headroom report is therefore rather an estimation or prediction than a direct measurement; the UE cannot directly measure its actual transmission power headroom for the subframe in which the report is to be transmitted.

A number of criteria are defined to trigger a power headroom report, i.e. a significant change in estimated path loss since the most recent power headroom report has been sent (more than a configured threshold), or a periodic power headroom reporting. The eNB can configure parameters to control each of these triggers depending on the system load and the requirements of its scheduling algorithm. The power headroom report is sent as a MAC Control Element. For Rel-8/9 it consists of a single octet where the two highest bits are reserved and the six lowest bits represent the 64 dB values (+40 to −23) mentioned above in 1 dB steps. For details of the PHR MAC CE please refer to TS36.321 section 6.1.3.6.

UL Power Control/Power Headroom for Carrier Aggregation

For the case of carrier aggregation, which is a Rel-10 feature, there is one independent power control loop for each UL component carrier/serving cell configured for the user equipment. As already mentioned above the setting of the UE Transmit power for a Physical Uplink Shared Channel (PUSCH) transmission in subframe i on serving cell c is defined as follows:

$$P_{PUSCH,c}(i) = \min\left\{ \begin{array}{c} P_{CMAX,c}(i), \\ 10\log_{10}(M_{PUSCH,c}(i)) + P_{O\_PUSCH,c}(j) + \alpha_c(j)\cdot PL_c + \Delta_{TF,c}(i) + f_c(i) \end{array} \right\} \quad [dBm]$$

Further details about the power control formulas for PUSCH, PUCCH and SRS can be found in technical specification (TS) 36.213. Since UL power control is operated per component carrier/serving cell also power headroom is reported per component carrier/serving cell, i.e. PH=$P_{CMAX,c}$−estimated PUSCH power. For the case of carrier aggregation, there are basically two power limits defined, a total maximum UE transmit power $P_{CMAX}$ and a component carrier-specific maximum transmit power $P_{CMAX,c}$. Further information about the definition of component carrier-specific maximum transmission power respectively the UE total maximum transmission power can be found in TS36.101. For carrier aggregation simultaneous PUSCH-PUCCH transmission is supported and is activated upon configuration by an eNB. Therefore an additional power headroom type was introduced which indicates the difference between $P_{CMAX,c}$ and the estimated PUSCH+PUCCH TX power. Consequently two different types of PH types are supported for carrier aggregation (CA):

PH type 1: $P_{CMAX,c}$−estimated PUSCH power

PH type 2: PCMAX,c−estimated PUSCH+PUCCH power

PH type 2 is only applicable for PCell, whereas PH type 1 is applicable for both the primary cell (PCell) and the secondary cell (SCell).

RAN1 agreed that a power headroom report accounts for the maximum power reduction (MPR); in other words, the power reduction applied by the user equipment is taken into account in the component carrier specific maximum transmission power $P_{CMAX,c}$. It should be noted that the eNB does not have knowledge of the power reduction applied by the UE, since the actual power reduction depends on the type of allocation, the standardized MPR value and also on the UE implementation. Therefore, eNB doesn't know the component carrier specific maximum transmission power relative to which the UE calculates the power headroom, i.e. eNB does not precisely know how close UE is operating to its total maximum transmission power $P_{CMAX}$. Hence there might be situations where UE is exceeding the total user equipment maximum transmission power $P_{CMAX}$ which would hence require power scaling. Therefore, in Rel-10 a new power headroom MAC control element, i.e. also referred to as extended PHR MAC CE, was introduced. Since it is beneficial for the eNB to always know the power situation for all activated uplink carrier/serving carrier for future uplink scheduling, the new extended power headroom MAC CE includes power headroom information (Type 1/Type 2) for each activated uplink component carrier. Whenever a PHR is triggered on any of the configured serving cells/component carrier the UE sends an extended PHR MAC CE which contains information for all serving cells.

Furthermore, it not only reports the power headroom value for a component carrier but also the corresponding $P_{CMAX,c}$ value. When a power headroom report is triggered, the UE transmits the extended power headroom MAC control element on one of the serving cells (PCell and SCells) which has a valid uplink resource for PUSCH. In cases where PUSCH and PUCCH are not transmitted Type 1 and Type 2 PH is calculated based on some predefined reference format. Corresponding PH report is also referred to as virtual PHR, i.e. PH is calculated using some virtual PUSCH respectively PUCCH transmission. Further details of the extended power headroom MAC control element can be found in section 6.1.3.6a of standard TS 36.321.

Power Control/Power Headroom for Dual Connectivity

Dual connectivity (DC) which was introduced in Rel-12 allows a UE to receive data simultaneously from different eNBs in order to boost the performance in a heterogeneous network with dedicated carrier deployment. More in detail a UE in RRC_CONNECTED is configured to utilize radio resources provided by two distinct schedulers, located in two eNBs connected via an interface, also referred to as X2 interface.

There is a Master eNB (MeNB) and one or more Secondary eNBs (SeNB). In LTE release 12 specifications, only the case of one MeNB and one SeNB is considered. The group of serving cells associated with the MeNB is referred to as master cell group (MCG), whereas the group of the serving cells associated with the SeNB is called secondary cell group (SCG). Scheduling of uplink transmissions in dual connectivity is more challenging compared to carrier aggregation since the scheduling decisions made in MeNB and SeNB cannot be coordinated instantaneously (due to the non-ideal interface between the two schedulers). Therefore it can easily happen that the scheduling grants from MeNB and SeNB will result in a situation where UE's maximum transmission power is exceeded leading to power scaling. In order to avoid those situations a minimum guaranteed power for the cell groups, i.e. P_MCG for MCG respectively P_SCG for SCG, has been introduced. More in detail the guaranteed minimum power level of a cell group is configured as a percentage of the maximum UE transmission power $P_{CMAX}$. The sum of the minimum guaranteed power level for both cell groups can be equal or smaller than $P_{CMAX}$. For the case that P_MCG+P_SCG<$P_{CMAX}$ the remaining power which is not dedicated to a specific cell group can be dynamically allocated to the MCG or SCG depending on the scheduling decision. In case less than the minimum guaranteed power is required for transmission in one of the cell groups, the power can be allocated to the other cell group.

Since dual connectivity can be used both for synchronous and asynchronous networks, in order to account for both network deployments two power control modes have been introduced for Rel-12, i.e. power control mode 1(PCM1) is used in synchronous networks whereas PCM2 is used for asynchronous networks. All Rel-12 must support PCM1. For UEs which are supporting also PCM2 for asynchronous networks the eNB configures which power control mode to use. For the PCM1 the remaining power—$P_{CMAX}$−(P_MCG+P_SCG)—is allocated to the MCG and/or SCG according to some predefined priority order, i.e. according to the UCI type. Basically highest priority is given to the hybrid automatic repeat request (HARM) feedback and scheduling request (SR) transmissions. Second highest priority is given to CSI, followed by PUSCH transmissions without uplink control information (UCI) and finally SRS transmission. In case same UCI type transmission takes place for MCG and SCG, MCG transmissions are prioritized. Further details about the PCM1 for dual connectivity can be found in TS36.213 section 5.1.4.

In the asynchronous network case, sub-frame boundaries are not aligned between MCG and SCG transmissions. Since the UE cannot quickly enough process uplink grants received for the other cell group (CG) when determining the transmission power for its own cell group, UE cannot consider required transmission power for PUSCH/PUCCH transmissions on the other cell group for the overlapping symbols. Therefore for the PCM2 the remaining power is allocated simply to the transmission which starts earlier. More details about PCM2 can be also found in section 5.1.4 of TS 36.213.

In dual connectivity when a PHR has been triggered, the UE sends power headroom information for all activated cells (including serving cells of both cell groups) to the eNB. When UE reports PH info of SCG cells to the MeNB or PH info of MCG cells to the SeNB, type 2 PH information for the PUCCH cell (PUCCH for the SCG) is always included. Power headroom info for the serving cells in the other CG is depending on eNB configuration either calculated based on some reference format (virtual PHR) or based on actual PUSCH/PUCCH transmissions.

Support of Short TTI and Short Processing Time for LTE

Packet data latency is one of the performance metrics that vendors, operators and also end-users (e.g., via speed test applications) regularly measure. In the 3GPP community, much effort has been put into increasing data rates by introducing features like carrier aggregation of up to 32 carriers, 8×8 MIMO, or 256 QAM. However to achieve the highest experienced rates, it is necessary to have both a high throughput and a low latency. Especially for smaller files latency has an important impact.

In an effort to address this in 3GPP, latency reduction techniques have been studied. It was found that reducing the transmission time interval (TTI) length and the processing time, i.e. time between allocation and the corresponding transmission/feedback can significantly reduce the user plane latency, and improve transmission control protocol (TCP) throughput. Furthermore, specifying solutions with smaller latency would e.g. allow UEs to reduce the L2 memory needed to buffer the "data in flight", allow for more robustness due to the ability to re-transmit more often within a certain delay bound, directly increase the perceived quality of experience for today's delay-sensitive real-time applications like gaming, voice or video telephony/conferencing, and allow addressing new future use cases such as critical MTC applications in a better way.

Since Rel-15 it is possible to configure the UE with a short processing time (SPT) and a shorter TTI length. If short processing time (SPT) for 1 ms TTI length is configured, the minimum timing from UL grant transmission to UL PUSCH transmission, and the timing from DL PDSCH transmission to HARQ feedback transmission is 3 ms. Short transmission time interval (Short TTI) provides support for TTI length shorter than 1 ms DL-SCH and UL-SCH. To support the short TTI, the associated control channels, SPDCCH (containing downlink control information (DCI) for short TTI operation, referred to as sDCI) and SPUCCH are also transmitted with duration shorter than 1 ms. Over the physical layer, DL and UL transmissions use either slots or subslots when short TTI is configured. A subslot is defined to be of either 2 OFDM/SC-FDMA symbol or 3 OFDM/SC-FDMA symbol duration. When short TTI is configured, extended cyclic prefix is not supported. For Short TTI, Uplink ACK/NAKs in response to downlink (re)transmissions are sent on SPUCCH or (sub)slot-PUSCH.

Uplink Asynchronous adaptive HARQ is used for HARQ processes scheduled with (sub)slot based PUSCH (also referred to as sPUSCH) and HARQ processes scheduled with SPT. Further detailed information on SPT and Short TTI can be found in related 3GPP specifications such as TS36.321, TS36.300, TS36.213.

According to 3GPP agreements:

A UE can be dynamically (with a subframe to subframe granularity) scheduled with legacy TTI unicast PDSCH and/or unicast sPDSCH For sPUSCH, a UE can be dynamically (with a subframe to subframe granularity) scheduled with PUSCH and/or sPUSCH.

For sPUSCH, only the TPC from sDCI is considered.

For PUSCH, only the TPC from DCI is considered.

Multiple Numerologies in NR

To support various requirements of different services (at least including enhanced mobile broadband (eMBB), ultra-reliable low-latency communications (URLLC), massive machine type communication (mMTC).), 5G/NR is envisioned to support different OFDM numerologies, i.e. subcarrier spacing (SCS), CP length, in a single framework. As identified in TR 38.913, the various use cases/deployment scenarios for NR have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC requires high connection density, large coverage in harsh environments, and extremely long-life battery for low cost devices. Therefore, the OFDM numerology (e.g. subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead. It was agreed to study different numerologies across different carrier(s) for a given UE as well as different numerologies within the same carrier for a given UE, i.e. different OFDM numerologies are multiplexed in frequency-domain and/or time-domain within the same carrier or across different carriers. This benefits simultaneous support of services with vastly different requirements, e.g. ultra-low latency communications (short symbols and thus wide subcarrier spacing) and MBMS services (long symbols to enable long cyclic prefix and thus narrow subcarrier spacing).

Power Headroom Reporting for CA with Carriers Configured with Different TTI Length For the case of aggregating resources from carriers configured with different TTI length, e.g. short TTI for LTE CA or different numerologies for the case of NR CA, power headroom (PHR) reporting may need to be studied further.

In LTE UE reports extended power headroom report for carrier aggregation, i.e. PH info for each activated serving cell is included (together with Pcmax). Since the subframe/

TTI length is in LTE same for all carriers the PHR reporting subframes, i.e. subframes which the power headroom information refers to, is aligned.

However NR due to the support of different numerologies or for LTE with Short TTI, one slot/TTI of a carrier can overlap (coincide) with multiple slots/TTIs of another carrier, i.e. eMBB on one carrier (e.g., with a long TTI length) and URLLC on another carrier (e.g., with a short TTI length). In this case the base station, e.g. eNB or gNB, when receiving an extended PHR would not be aware of which slot/TTI a Power headroom information refers to. For example, in a scenario where an extended PHR report is triggered and subsequently transmitted in a slot/TTI, which overlaps with multiple slots/TTIs on a different carrier, the base station would not know which of the overlapped slot/TTI from the multiple slots/TTIs is the reference for the PH calculation. Therefore, it may base its future scheduling decisions on wrong assumptions, i.e. how close the UE is operating on the power limit, which may lead to either power scaling or under-utilization of resources. This issue may be more pronounced if a) elements of power control procedure are quite different across two or more of the overlapped slot/TTI from the multiple slots/TTIs, for instance, resource allocation or open-loop power control parameters (P0, alpha) or closed-loop power adjustment (f).

b) sPUCCH (PUCCH which contains control information such as HARQ-ACK, CSI, etc. sent in UL by the UE for short TTI) is sent along with sPUSCH (PUSCH for short TTI) for some sTTIs and PUSCH only is transmitted for other sTTIs when type 2 PHR reporting is used.

It should be noted that throughout the document the term slot/TTI is used to denote the unit for uplink transmission duration. Data transmissions can be scheduled to span one or multiple slots/TTIs.

5G Specification Regarding PHR

According to TS38.213:

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c.

A UE determines whether a power headroom report for an activated serving cell [11, TS 38.321] is based on an actual transmission or a reference format based on the higher layer signaling of configured grant and periodic/semi-persistent sounding reference signal transmissions and downlink control information the UE received until and including the PDCCH monitoring occasion where the UE detects the first DCI format 0_0 or DCI format 0_1 scheduling an initial transmission of a transport block since a power headroom report was triggered if the power headroom report is reported on a PUSCH triggered by the first DCI. Otherwise, a UE determines whether a power headroom report is based on an actual transmission or a reference format based on the higher layer signaling of configured grant and periodic/semi-persistent sounding reference signal transmissions and downlink control information the UE received until the first uplink symbol of a configured PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the power headroom report is reported on the PUSCH using the configured grant.

If a UE
- is configured with two UL carriers for a serving cell, and
- determines a Type 1 power headroom report and a Type 3 power headroom report for the serving cell the UE
- provides the Type 1 power headroom report if both the Type 1 and Type 3 power headroom reports are based on respective actual transmissions or on respective reference transmissions
- provides the power headroom report that is based on a respective actual transmission if either the Type 1 report or the Type 3 report is based on a respective reference transmission.

If a UE is configured with a SCG and if phr-ModeOtherCG for a CG indicates 'virtual' then, for power headroom reports transmitted on the CG, the UE computes PH assuming that the UE does not transmit PUSCH/PUCCH on any serving cell of the other CG.

If the UE is configured with a SCG,
- For computing power headroom for cells belonging to MCG, the term 'serving cell' in this subclause refers to serving cell belonging to the MCG.
- For computing power headroom for cells belonging to SCG, the term 'serving cell' in this subclause refers to serving cell belonging to the SCG. The term 'primary cell' in this subclause refers to the PSCell of the SCG.

If the UE is configured with a PUCCH-SCell,
- For computing power headroom for cells belonging to primary PUCCH group, the term 'serving cell' in this subclause refers to serving cell belonging to the primary PUCCH group.
- For computing power headroom for cells belonging to secondary PUCCH group, the term 'serving cell' in this subclause refers to serving cell belonging to the secondary PUCCH group. The term 'primary cell' in this subclause refers to the PUCCH-SCell of the secondary PUCCH group.

For a UE configured with EN-DC/NE-DC and capable of dynamic power sharing, if E-UTRA Dual Connectivity PHR [14, TS 36.321] is triggered and if the duration of NR slot on active UL BWP is different from that of E-UTRA subframe carrying the Dual Connectivity PHR, UE provides power headroom of the first NR slot that fully overlaps with the E-UTRA subframe.

If a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as $$PH_{type1,b,f,c}(i,j,q_d,l)=P_{CMAX,f,c}(i)-\{P_{O\_PUSCH,b,f,c}(j)+10\log_{10}(2^{\mu}\cdot M_{RB,b,f,c}^{PUSCH}(i))+\alpha_{b,f,c}(j)\cdot PL_{b,f,c}(q_d)+\Delta_{TF,b,f,c}(i)+f_{b,f,c}(i,l)\}[\mathrm{dB}]$$

where $P_{CMAX,f,c}(i)$, $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c}(i)$ and $f_{b,f,c}(i,l)$ are defined in Subclause 7.1.1.

If a UE is configured with multiple cells for PUSCH transmissions, where a SCS configuration $\mu_1$ on active UL BWP $b_1$ of carrier $f_1$ of serving cell $c_1$ is smaller than a SCS configuration $\mu_2$ on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if the second PUSCH transmission is scheduled by a DCI format 0_0 or a DCI format 0_1 in a PDCCH received in a second PDCCH monitoring occasion, and the second PDCCH monitoring occasion is after a first PDCCH monitoring occasion where the UE detects the earliest DCI format 0_0 or DCI format 0_1 scheduling an initial transmission of a transport block after a power headroom report was triggered or the second PUSCH transmission is after the first uplink symbol of the first PUSCH transmission minus $T'_{proc,2}=T_{proc,2}$ where $T_{proc,2}$ is determined according to [6, TS 38.214] assuming $d_{2,1}=1$, $d_{2,2}=0$, and with $\mu_{DL}$ corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l)=\tilde{P}_{CMAX,f,c}(i)-\{P_{O\_PUSCH,b,f,c}(j)+\alpha_{b,f,c}(j)\cdot PL_{b,f,c}(i,l)\}\ [\mathrm{dB}]$$

where $\tilde{P}_{CMAX,f,c}(i)$ is computed assuming MPR=0 dB, A-MPR=0 dB, P-MPR=0 dB. $\Delta T_C=0$ dB. MPR, A-MPR, P-MPR and $\Delta T_C$ are defined in [8-1, TS 38.101-1], [8-2, TS38.101-2] and [8-3, TS 38.101-3]. The remaining parameters are defined in Subclause 7.1.1 where $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0.

If a UE is configured with two UL carriers for a serving cell and the UE determines a Type 1 power headroom report for the serving cell based on a reference PUSCH transmission, the UE computes a Type 1 power headroom report for the serving cell assuming a reference PUSCH transmission on the UL carrier provided by pusch-Config. If the UE is provided pusch-Config for both UL carriers, the UE computes a Type 1 power headroom report for the serving cell assuming a reference PUSCH transmission on the UL carrier provided by pucch-Config. If pucch-Config is not provided to the UE for any of the two UL carriers, the UE computes a Type 1 power headroom report for the serving cell assuming a reference PUSCH transmission on the non-supplementary UL carrier.

UL Pre-Emption Indication

Dynamic multiplexing between eMBB and URLLC traffic in the DL was specified in Rel-15 standard specifications. However, aspect of how to multiplex UL traffic from UE and/or system perspective is still open.

For DLPI (DL pre-emption indication), DCI format 2_1 is used for notifying the PRB(s) and OFDM symbol(s) where UE may assume no transmission is intended for the UE.

The following information is transmitted by means of the DCI format 2_1 with CRC scrambled by INT-RNTI:

Pre-emption indication 1, Pre-emption indication 2, . . . , Pre-emption indication N.

The size of DCI format 2_1 is configurable by higher layers up to 126 bits, according to Subclause 11.2 of [TS38.213]. Each pre-emption indication is 14 bits. Interpretation of the 14-bit bitmap is configurable: each bit represents either of one OFDM symbol in the time domain and the full bandwidth part in frequency domain, or two OFDM symbols in the time domain and one half of the bandwidth part in frequency domain.

UE behavior upon DLPI reception is undefined.

As opposed to DLPI where number of resource blocks (RBs) in frequency domain can change abruptly from one symbol to another symbol, in ULPI, such abrupt changes are not desired because of RF limitations. Also, ULPI is different than DLPI as it is used to avoid UL interference, whereas in DL, gNB has already avoided the DL interference by selecting one out of overlapping/interfering DL transmissions.

UL cancellation (pre-emption) of an eMBB PUSCH transmission has been adopted as a toll for inter UE multiplexing (e.g., eMBB traffic of UE1 and URLLC traffic of UE2). The scheme has advantage of ensuring latency (and reliability) of the URLLC traffic by timely muting the eMBB traffic of another UE. The scheme can also be advantageous to eMBB UEs by letting them be scheduled over a wide bandwidth (instead of semi-static bandwidth split between URLLC UEs and eMBB UEs) and only get muted if needed. However, there are costs and disadvantages associated with the scheme: (a) the UL cancelation indication needs to be monitored quite frequently (at least when the UE has unacknowledged UL eMBB transmission or configured wideband SRS transmission) in a timely manner to be helpful in ensuring latency of URLLC UEs (b) the UL cancelation indication should have a high reliability (c) UL cancelation indication can incur control overhead (d) there could be eMBB UEs in a cell that are not capable of performing UL cancelation operation, which could hurt the URLLC performance if overlap. UL cancelation has been proposed with different flavors: for instance, completely canceling eMBB PUSCH, resuming eMBB PUSCH after canceling a part of PUSCH, pausing eMBB PUSCH for a period or rescheduling eMBB PUSCH.

An alternative scheme for inter UE multiplexing, can be boosting transmission power of URLLC UEs (in case of overlapping eMBB transmission of other UEs). However, power boosting may not be applicable to power limited UEs or may lead to increased inter cell interference. A combination of UL cancelation (with some relaxation of cancelation indication e.g., in terms of timeline, and monitoring frequency) and power boosting may also be used to address inter UE multiplexing.

In some cases, using an UL cancelation indication may be possible: for instance, when all active eMBB UEs in a cell are capable of UL cancelation operation or when eMBB UEs that are not capable of UL cancelation operation are given non-overlapping resources with URLLC UEs) or when eMBB UEs can also have URLLC traffic (and hence would monitor for URLLC DCI) or when a hybrid cancelation-power boosting technique is used.

Multi-TRP Operation

Multi-TRP operation can enhance the communication reliability. Each TRP can be associated with a TCI state, and a single PDCCH (typically for ideal/low-latency backhaul among TRPs) is used to schedule PDSCH(s) associated with different TRPs. For non-ideal backhaul among TRPs different PDCCHs can schedule different PDSCHs corresponding to different TRPs. Also, for ensuring high reliability of PDCCH, the same DCI might be signaled via different TRPs.

According to TS 38.214 V15.4.0, a UE can be higher-layer configured with a list of up to M TCI-State configurations to decode PDSCH intended for the UE in a serving cell, where M depends on the UE capability. Each TCI-State contains parameters for configuring a quasi-co-location relationship between one or two downlink reference signals and the DM-RS ports of the PDSCH. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

According to TS 38.214 V15.4.0, if a UE is configured with the higher layer parameter tci-PresentInDCI that is set as 'enabled' for the CORESET scheduling the PDSCH, the UE assumes that the transmission configuration indication (TCI) field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold Threshold-Sched-Offset, where the threshold is based on reported UE capability, for determining PDSCH antenna port quasi co-location, the UE assumes that the TCI state or the QCL assumption for the PDSCH is identical to the TCI state or QCL assumption whichever is applied for the CORESET used for the PDCCH transmission. If the tci-PresentInDCI is set as 'enabled', the TCI field in DCI in the scheduling component carrier points to the activated TCI states in the scheduled component carrier or DL BWP and when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability.

i. Multi-TRP for URLLC
   - In 3GPP, candidate schemes for multi-TRP based URLLC, scheduled by single DCI at least, are as follows:
     - Scheme 1 (SDM): n ($n<=N_s$) TCI states within the single slot, with overlapped time and frequency resource allocation
       - Scheme 1a:
         - Each transmission occasion is a layer or a set of layers of the same TB, with each layer or layer set is associated with one TCI and one set of DMRS port(s).
         - Single codeword with one RV is used across all spatial layers or layer sets. From the UE perspective, different coded bits are mapped to different layers or layer sets with the same mapping rule as in Rel-15.
       - Scheme 1b:
         - Each transmission occasion is a layer or a set of layers of the same TB, with each layer or layer set is associated with one TCI and one set of DMRS port(s).
         - Single codeword with one RV is used for each spatial layer or layer set. The RVs corresponding to each spatial layer or layer set can be the same or different.
         - FFS: codeword-to-layer mapping when total number of layers<=4
       - Scheme 1c:
         - One transmission occasion is one layer of the same TB with one DMRS port associated with multiple TCI state indices, or one layer of the same TB with multiple DMRS ports associated with multiple TCI state indices one by one.
       - Applying different MCS/modulation orders for different layers or layer sets can be discussed.
     - Scheme 2 (FDM): n ($n<=N_f$) TCI states within the single slot, with non-overlapped frequency resource allocation.
       - Each non-overlapped frequency resource allocation is associated with one TCI state.
       - Same single/multiple DMRS port(s) are associated with all non-overlapped frequency resource allocations.
       - Scheme 2a:
         - Single codeword with one RV is used across full resource allocation. From UE perspective, the common RB mapping (codeword to layer mapping as in Rel-15) is applied across full resource allocation.
       - Scheme 2b:
         - Single codeword with one RV is used for each non-overlapped frequency resource allocation. The RVs corresponding to each non-overlapped frequency resource allocation can be the same or different.
       - Applying different MCS/modulation orders for different non-overlapped frequency resource allocations can be discussed.
       - Details of frequency resource allocation mechanism for FDM 2a/2b with regarding to allocation granularity, time domain allocation can be discussed.
     - Scheme 3 (TDM): n ($n<=N_{t1}$) TCI states within the single slot, with non-overlapped time resource allocation
       - Each transmission occasion of the TB has one TCI and one RV with the time granularity of mini-slot.
       - All transmission occasion (s) within the slot use a common MCS with same single or multiple DMRS port(s).
       - RV/TCI state can be same or different among transmission occasions.
       - FFS channel estimation interpolation across mini-slots with the same TCI index Scheme 4 (TDM): n (n<=$N_{t2}$) TCI states with K (n<=K) different slots.

Each transmission occasion of the TB has one TCI and one RV.

All transmission occasion (s) across K slots use a common MCS with same single or multiple DMRS port(s)

RV/TCI state can be same or different among transmission occasions.

FFS channel estimation interpolation across slots with the same TCI index

Note that M-TRP/panel based URLLC schemes shall be compared in terms of improved reliability, efficiency, and specification impact.

Note: Support of number of layers per TRP may be discussed

Related 3GPP agreements:

To support multiple-PDCCH based multi-TRP/panel transmission with intra-cell (same cell ID) and inter-cell (different Cell IDs), following RRC configuration can be used to link multiple PDCCH/PDSCH pairs with multiple TRPs one CORESET in a "PDCCH-config" corresponds to one TRP Agreement For separate ACK/NACK feedback for PDSCHs received from different TRPs, the UE should be able to generate separate ACK/NACK codebooks identified by an index, if the index is configured and applied across all CCs FFS: for the index per TRP basis, e.g. a higher layer signaling index, PRI in L1, CORESET group ID, slot or subslot index in L1.

Support joint HARQ-Ack feedback for PDSCHs received from different TRPs where multiple DCIs are used.

When the PUCCH resources are on the different slots, which are indicated by PDSCH-to-HARQ feedback timing indicator fields of multiple DCIs for different TRPs, both type-1 HARQ-ACK codebook and type-2 HARQ-ACK codebook are supported.

FFS, additional specification impact from Rel-15

Note that it can include other M-DCI NCJT NW implementation cases in Rel-16

Agreement

The index to be used to generate separated ACK/NACK codebook is a higher layer signaling index per CORESET.

Note that the index may not be configured for scenarios if there is no ambiguity of codebook generation at the UE, e.g. slot based PUCCH resource allocation per TRP.

This does not preclude configuring the index for other purposes.

Further clarify details on how to generate separated ACK/NACK codebook by email discussion including how to use such an index.

Further clarify details on how to generate joint ACK/NACK codebook by email discussion including whether/how to use such an index.

Agreement

Support following principles for DMRS port indication design for non-coherent joint transmission (NCJT) based on single-PDCCH multi-TRP, at least for single front-load symbol and eMBB.

Antenna port field size is the same as Rel-15, at least for DCI format 1-1.

At least support following layer combinations from two TRPs indicated by antenna port field:

1+1, 1+2, 2+1, 2+2 for single CW and SU, at least for DCI format 1-1

To be evaluated to determine whether introducing following design principles for DMRS entries in RAN1 #98:

1+3 and/or 3+1

MU cases, i.e. between NCJT UE+NCJT UE and NCJT UE+S-TRP UE

Two CWs for the case of total layers of NCJT reception more than 4.

Agreement

For M-TRP based URLLC, support both 2a and 2b

Scheme 2a and 2b have separate UE capabilities.

For scheme 2b,

Additional UE capability is specified to inform the gNB whether the UE can support CW soft combining Support up to two-layer transmission In the case of one layer, up to two CBs per CW In the case of two layers, one CB per CW FFS: Support of multi-DCI based FDM scheme with repetition (to be concluded in RAN1 #98)

FFS: Support of independent MCS selection for each TRP.

Agreement

For single-DCI based M-TRP URLLC schemes 3 & 4, support following design with respect to The maximal number of transmission layers per transmission occasion, down-select one from the following options:

Option 1: up to single layer transmission

Option 2: up to two layers transmission

PDSCH repetition indication mechanism:

Number of repetitions, down-select one from following options:

Option 1: Dynamic indication

Option 2: High-layer configured as Rel-15

Use the following as starting point for discussion

For single-DCI based M-TRP URLLC schemes 3 & 4, support following design with respect to Resource allocation in time domain:

FFS for further details

FFS: whether a minimal gap between PDSCH mini-slot/slot groups is needed

FFS: whether the same number of symbols should be used for each repetition

Resource allocation at frequency domain:

Same frequency domain resource allocation across repetitions as Rel-15.

For the number of TCI states across PDSCH repetitions, down-select one from following options:

Option 1: up to 2

One TCI codepoint can indicate up to 2 TCI states as already agreed in Rel-16 for eMBB Option 2: up to 4

Option 2-1: One TCI codepoint can indicate up to 4 TCI states

Option 2-2: Dedicated TCI field is not needed. For example, TCI states and RV sequences are jointly preconfigured and the combination of TCI states/RV sequences is jointly indicated in DCI.

One codepoint in joint field to indicate up to 4 TCI states and corresponding RV sequences.

RV sequences for PDSCH repetitions

Option 1: support Rel-15 RV sequences at least FFS whether RV sequences {0, 0, 0, 0} and {0, 3, 0, 3} are needed in Rel-16

Option 2: RV sequences are preconfigured by higher layer without restriction of specific orders in spec.

FFS how to map indicated TCI states and RV sequences to transmission occasions

Eg. Support Rel-15 RV sequence per TRP

LDPC base graph and TBS shall be same across repetition.

Agreement

At least for eMBB with M-DCI NCJT in order to generate different PDSCH scrambling sequences, support enhancing RRC configuration to configure multiple dataScramblingIdentityPDSCH FFS details including how to associate dataScramblingIdentityPDSCH with TRPs.

Agreement

For rate matching mechanism used for multi-DCI based multi-TRP/panel transmission, support following enhancements:

For LTE CRS, extending lte-CRS-ToMatchAround to be configured with multiple CRS patterns in a serving cell FFS: Whether/how they apply to one or multiple CRS patterns per PDSCH FFS: Whether/how it is applied to single DCI based NCJT.

A Periodic SRS

3GPP Specification from TS 38.212:

DCI format 2_3 is used for the transmission of a group of TPC commands for SRS transmissions by one or more UEs. Along with a TPC command, a SRS request may also be transmitted. The following information is transmitted by means of the DCI format 2_3 with CRC scrambled by TPC-SRS-RNTI:

block number 1, block number 2, . . . , block number B where the starting position of a block is determined by the parameter startingBitOfFormat2-3 or startingBitOfFormat2-3SUL-v1530 provided by higher layers for the UE configured with the block.

If the UE is configured with higher layer parameter srs-TPC-PDCCH-Group=typeA for an UL without PUCCH and PUSCH or an UL on which the SRS power control is not tied with PUSCH power control, one block is configured for the UE by higher layers, with the following fields defined for the block:

SRS request—0 or 2 bits. The presence of this field is according to the definition in Subclause 11.4 of [5, TS38.213]. If present, this field is interpreted as defined by Table 7.3.1.1.2-24.

TPC command number 1, TPC command number 2, . . . , TPC command number N, where each TPC command applies to a respective UL carrier provided by higher layer parameter cc-IndexInOneCC-Set.

If the UE is configured with higher layer parameter srs-TPC-PDCCH-Group=typeB for an UL without PUCCH and PUSCH or an UL on which the SRS power control is not tied with PUSCH power control, one block or more blocks is configured for the UE by higher layers where each block applies to an UL carrier, with the following fields defined for each block:

SRS request—0 or 2 bits. The presence of this field is according to the definition in Subclause 11.4 of [5, TS38.213]. If present, this field is interpreted as defined by Table 7.3.1.1.2-24.

TPC command—2 bits

According to a possible embodiment, if a UE is configured with adaptation of the minimum applicable value of K2, referred to as K2_min for cross-slot scheduling (where K2 refers to PDCCH-to-PUSCH timing), if a PHR is triggered for the UE and the UE is configured with multiple cells for PUSCH transmissions, the PHR cut-off time (e.g., the PHR cut-off time determines whether a power headroom report for an activated serving cell is based on an actual transmission or based on a reference format, and/or whether an overlapping PUSCH transmission for another serving cell is considered for computation of the PHR in a PUSCH on a serving cell) is determined based on an offset to the first UL DCI scheduling an initial transmission of a transport block received after the PHR trigger (in one example, if the power headroom report is reported on a PUSCH triggered/scheduled by the first DCI). The offset is determined based on K2_min (see FIG. 3).

a. In one implementation, for K2_min>threshold, the PHR cut-off time is the slot (e.g., end of the slot) in which the first DCI after the PHR trigger is received plus 'W' slots (e.g., W=1 slot; threshold=2 slots)
   i. In one implementation threshold>W
   ii. In one implementation, 'threshold', and 'W' are determined based on higher layer signaling, or a UE capability or a processing (such as PDCCH processing/signal preparation for physical uplink shared channel (PUSCH)/SRS) capability.
b. In one example, the offset is based on the difference between the K2_min value with Power saving (e.g., L1-based adaptation based on most recent L1 indication of minimum applicable K2 value) configured or applicable and default K2_min when cross-slot scheduling power savings or L1 adaptation is not configured or applicable for PUSCH (e.g., PUSCH scheduled by RAR UL grant, PUSCH scheduled with TC-RNTI).
c. In one example, the offset is based on the difference between the K2_min value with Power saving (e.g., L1-based adaptation based on most recent L1 indication of minimum applicable K2 value) and a parameter 'Q', where 'Q' is determined based on higher layer signaling, or a UE capability or a processing capability (such as PDCCH processing/signal preparation for physical uplink shared channel (PUSCH)/SRS).
d. In one implementation, whether to apply the offset for PHR cut-off time determination can be configured via RRC/indicated by higher layer signaling (such as MAC-CE) or indicated in a DCI (e.g., in the first DCI) or determined based on a UE capability.

In another example, the PHR cutoff time is the time until the first uplink symbol of the PUSCH transmission minus an offset (e.g, PUSCH preparation procedure time e.g. as defined in TS 38.214).

In one example, the offset may be indicated e.g., based on L1 indication (e.g., together with the value of K2_min e.g., in a power saving signal).

In one example, the PHR is restricted to be sent on only serving cells for which power saving is not configured (e.g, on cells no power savings technique configured or on cells which a particular power saving technique (e.g., cross-slot scheduling) not configured or a set of power savings techniques not configured or from a set of power savings techniques not configured) when at least one serving cell is configured without power saving.

In one example, the PHR is restricted to be sent on only serving cells for which power saving is not configured (e.g, no power savings technique configured or a particular power saving technique (e.g., cross-slot scheduling) or a set or from a set of power savings techniques not configured) when at least there is one active serving cell that is not configured with power saving.

In one example, the PHR is restricted to be sent on only serving cells for which power saving is not configured (e.g, no power savings technique configured or a particular power saving technique (e.g., cross-slot scheduling) or a set or from a set of power savings techniques not configured) when at least there is one active serving cell (referred here as to 'CC2') that is not configured with power saving, and when a timer is not expired. In one implementation, the timer can be started or restarted from the most recent PUSCH transmission/DCI scheduling a PUSCH on CC2.

In another example, for DCIs triggering/scheduling PUSCH transmissions on different serving cells received in corresponding monitoring occasions within a time window (e.g., within the same slot or within 'x' slots or 'x' OFDM symbols from the first DCI received after PHR is triggered), the PUSCH transmission corresponding to a serving cell configured without power saving is selected for reporting the PHR. The PHR cut-off time is based on the DCI triggering the selected PUSCH transmission. In one example, the PHR cut-off time is based on the DCI that is the first (or earliest) received DCI from the set of received DCIs associated with serving cells configured without power saving. In another example, the selected PUSCH transmission is the PUSCH transmission with the earliest starting transmission time from the PUSCH transmissions associated with serving cells not configured with power saving. The value of 'x' may be based on K2_min, for example difference between the K2_min value with Power saving configured and default K2_min when cross-slot scheduling power savings or L1 adaptation is not configured or applicable).

Figure 3:
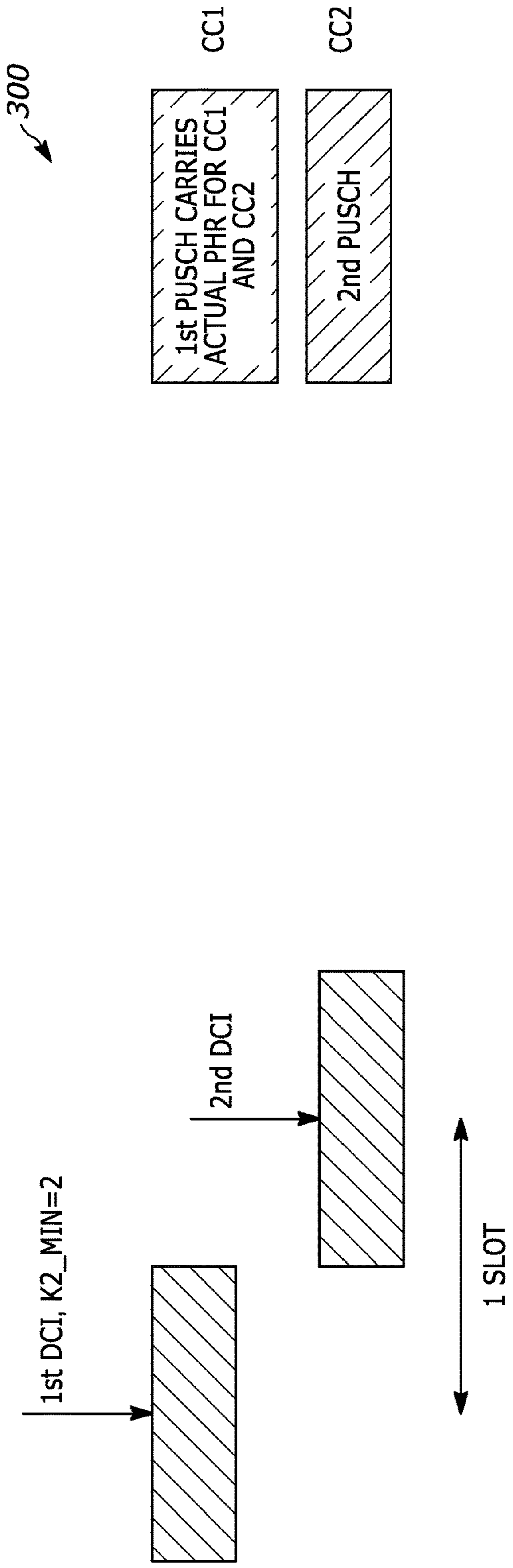
FIG. 3 is a transmission timing diagram including a pair of component carriers.

FIG. 3 includes a transmission timing diagram 300 including a pair of component carriers. More specifically, the transmission timing diagram illustrates a PHR cut-off time relaxation by 1 slot in case PHR is transmitted on the first component carrier.

K0_Min/K2_Min Definition

This section describes how K0_min/K2_min values are defined (e.g., whether the set of k0_min/K2_min values are defined per search space and/or per BWP, etc.).

2. In an embodiment, the UE receives a first indication of one value from one or multiple preconfigured value(s). Based on the indication, the UE determines K0_min/K2_min. The indication can be independent for K0_min and K2_min. In an example,
   - when M-TRP (multi-TRP) operation is not configured, RRC signaling can indicate/configure a first set of K0_min or K2_min values e.g., {0, 1} slots
   - when M-TRP is configured, RRC signaling can indicate/configure a second set of K0_min or K2_min values e.g., {0, 2}
3. In another embodiment, a first set of K0_min or K2_min values can belong to/defined per a first
   - a) CORESET configuration or
   - b) PDCCH configuration or
   - c) search space configuration and a second set of K0_min or K2_min values can belong to/defined per a second
   - a) CORESET configuration or
   - b) PDCCH configuration or
   - c) search space configuration.

The first/second CORESET configuration definition can be similar to definition of ControlResourceSet defined in TS38.331.

The first/second PDCCH configuration definition can be similar to definition of PDCCH-Config defined in TS 38.331.

The first/second search space configuration definition can be similar to SearchSpace information element (IE) used in TS 38.331
   - According to TS 38.331: The IE SearchSpace defines how/where to search for PDCCH candidates. Each search space is associated with one ControlResourceSet. For a scheduled cell in the case of cross carrier scheduling, except for nrofCandidates, all the optional fields are absent.

In an example, some of the search spaces may have only a single value for K0_min/K2_min (e.g., K0_min=0) while some other search spaces may have multiple values for the set of K0_min/K2_min.

4. In an embodiment, if a UE monitors PDCCH candidates in one or more search space sets in a slot wherein dynamic adaptation of K0_min/K2_min is not applicable to some of the RNTIs/search space sets of the slot, power saving via cross-slot scheduling is not applicable to the whole set of PDCCH candidates in the slot.
5. In an embodiment, the set of K0_min/K2_min values are defined per BWP. Alternatively, the set of K0_min/K2_min values are defined per group of BWPs. In one example, one set of K0_min/K2_min values are defined for the initial/default BWP (first group of BWPs) and another set of K0_min/K2_min values are defined for other BWPs (second group of BWPs) of a serving cell. In one example, all the BWPs in a group of BWPs may have the same subcarrier spacing.
   - a. If the UE supports active BWP change via DCI, since before decoding the DCI, the UE does not know if BWP is going to be changed or not, therefore, the current or latest K0_min/K2_min on the current BWP (or BWP on which the DCI is received) is applied to the scheduled transmission on the target BWP, respecting the BWP switching delay and any scaling due to SCS. Also the triggering offset for aperiodic CSI-RS/SRS is implicitly derived based on the current value of K0_min/K2_min on the current BWP. In one example, the current or latest K0_min/K2_min (with appropriate scaling due to changes in PDCCH DCI and PDSCH/PUSCH subcarrier spacing) is applied until a new L1-indication with updated K0_min/K2_min is received.
   - b. A default value of K0_min/K2_min can be defined per BWP/group of BWPs. After the BWP switch the UE defaults back to the default value of cross-slot scheduling (default K0_min/K2_min) for the target BWP (see FIG. 4)
     - i. as the power saving gain might be different in different BWPs due to different parameters, including SCS, maximum number of configured MIMO layers (at least initial BWP and other BWPs), etc.
     - ii. Also, probably the reason for BWP change was to have more/less traffic, and cross-slot scheduling (in general power saving) might need to be disabled/enabled.

iii. In case of BWP switching between BWPs of a group of BWP having the same set of K0_min/K2_min (respecting the BWP switching delay and any scaling due to SCS), switching back to the default BWP is not needed/applicable.

iv. In one example, the default value of K0_min/K2_min may correspond to the value when cross-slot scheduling power savings or L1 adaptation is not configured or applicable for PDSCH/PUSCH.

Figure 4:
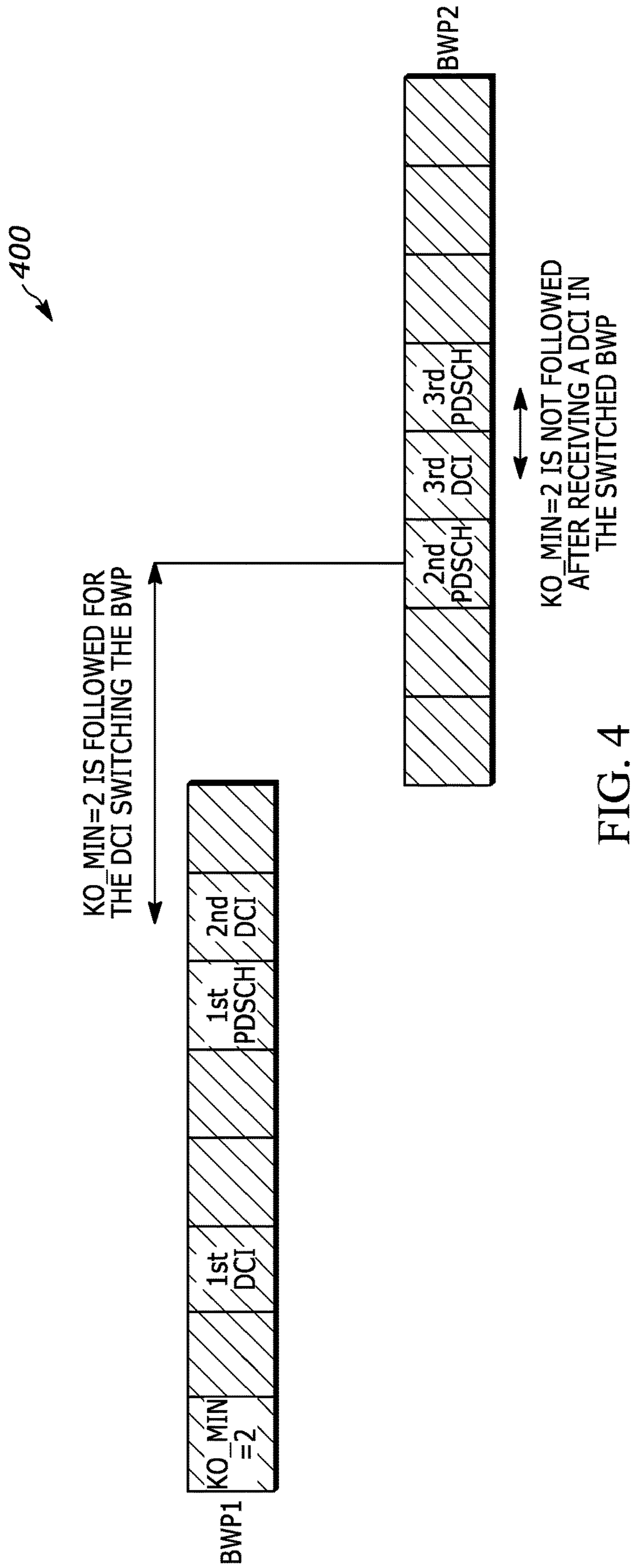
FIG. 4 is a transmission timing diagram for a pair of bandwidth parts.

FIG. 4 illustrates a transmission timing diagram 400 for a pair of bandwidth parts. More specifically, the transmission timing diagram includes an instance where for the 2nd PDSCH, K0_min indicated in the first BWP is applicable, but not for the 3rd PDSCH as it is scheduled in the second BWP; the default value of K0_min in BWP 2 was 0.

In one example, for a serving cell configured with two carriers (non-SUL and SUL (supplementary Uplink)), different power saving configurations may be applicable for SUL carrier and non-SUL carrier. In one example, power saving is configured for a first carrier (SUL) and not configured for a second carrier (non-SUL). In another example, power saving is configured for a first carrier (non-SUL) and not configured for a second carrier (SUL). In another example, same power saving configuration should be applied to both SUL and non-SUL carrier. In one implementation, the same K2_min is applicable to transmissions of both SUL and non-SUL if a scheduling DCI indicates if the PUSCH transmission would occur on the SUL carrier or on the non-SUL carrier.

BWP Switching and URLLC

This section provides mechanisms for handling (such as condition for allowing/avoiding) BWP switching as a result of using power saving techniques (or for some other purposes, e.g. load distribution across sub-bands of the carrier, more scheduling freedom at a network entity) on a first serving cell when URLLC service is configured on a second serving cell or when UL pre-emption is monitored on the second serving cell.

Such power saving techniques could include UE adaptation to the maximum number of MIMO layers. (e.g., via configuration of a different MIMO layer configuration of the initial/default BWP compared with other BWPs of a Serving Cell, or different maximum number of MIMO layer configurations for different subcarrier spacing configured for different BWPs.)

It is noted that according to TS 38.133 sections 8.2.1.2.7 and 8.6:

When UE receives a DCI indicating UE to switch its active BWP involving changes in any of the parameters listed in Table 8.2.1.2.7-2, the UE is allowed to cause interruption of up to X slot to other active serving cells if the UE is not capable of per-FR gap, or if the BWP switching involves SCS changing. When the BWP switch imposes changes in any of the parameters listed in Table 8.2.1.2.7-2 and the UE is capable of per-FR gap, the UE is allowed to cause interruption of up to X slot to other active serving cells in the same frequency range wherein the UE is performing BWP switching. X is defined in Table 8.2.1.2.7-1. The starting time of interruption is only allowed within the BWP switching delay TBWPswitchDelay as defined in clause 8.6.2. Interruptions are not allowed during BWP switch involving other parameter change.

One or more of the following methods can be applied if a UE is configured for/enabled to apply power saving techniques on a first serving cell when URLLC service is configured (i.e. URLLC related RRC parameters are configured for the UE on the second serving cell, and the UE operates according to URLLC related L1/L2/L3 procedures) on a second serving cell or when UL pre-emption is monitored on the second serving cell, Method 1: a BWP switch for power saving (or for other purposes) on CC1(first serving cell) is not allowed unless the two serving cells (the first and the second serving cells) are on different frequency range and the UE is capable of per-FR gap.

Method 2: the maximum number of MIMO layers should be the same on all BWPs of the first serving cell.

Method 3: BWP switch for power saving is only allowed if a timer, referred to as here urllc-inactivity-timer (URLLC-IAT) expires or is not running. The timer starts (or restarts) after (e.g., in the first symbol after the end of) a URLLC transmission and expires if the there is no URLLC transmission on the second serving cell for a period of time defined as the maximum timer value or the duration of the timer.

Method 4: the UE is not expected/allowed to cause interruption to the second serving cell due to BWP switching on the first serving cell if the UE is not capable of per-FR gap, or if the BWP switching involves SCS changing.

In case of multiple serving cells, the UE may choose to interrupt other serving cells than the second serving cell.

In an example, if the UE is configured with SUL and if it has a PUSCH-Config for both UL (non-SUL) carrier and SUL carrier, a first group of BWPs of the first carrier of a serving cell (e.g., non-SUL carrier), and a second group of BWPs of the first carrier of the serving cell have different MIMO configurations (e.g., have different maximum number of MIMO layers)

a first group of BWPs of the second carrier of the serving cell (e.g., SUL carrier), and a second group of BWPs of the second carrier of the serving cell have different MIMO configurations (e.g., have different maximum number of MIMO layers)

and wherein MIMO configurations of the first carrier and the second carrier may be different; alternatively, the carriers may have the same MIMO configurations (e.g., the first group of BWPs of the first carrier and the second group of BWPs of the second carrier have the same MIMO configuration e.g., maximum number of MIMO layers).

Aperiodic SRS

This section provides detailed mechanisms to enable cross-slot scheduling power saving for aperiodic SRS (A-SRS) operation. In 3GPP Rel-15, a non-zero A-SRS triggering offset value can be configured per SRS resource set (TS 38.331, parameter slotOffset for resource Type: aperiodic in SRS-Config). If a cross-slot scheduling based power saving mode is configured and/or activated for a UE, the UE may perform procedures/actions described herein:

In an embodiment, to adapt the minimum applicable value of aperiodic SRS triggering offset for an active UL BWP, implicit indication by defining the minimum applicable value to be the larger of the minimum applicable K2 value (K2_min) when indicated and the corresponding RRC parameter slotOffset.

In an embodiment, the UE will not transmit SRS corresponding to an SRS resource set that is triggered by an SRS request if the corresponding slotOffset parameter associated with the SRS resource set is smaller than K2_min.

In another embodiment, the UE transmits SRS corresponding to an SRS resource set using the minimum applicable value of aperiodic SRS triggering offset (e.g., equal to K2_min) if the corresponding slotOffset parameter associated with the SRS resource set is smaller than K2_min.

The UE receives a downlink DCI, a group common DCI, or an uplink DCI based command where a codepoint of the DCI field 'SRS request' may trigger one or more SRS resource set(s).

In an embodiment, if the UE receives a DCI where a codepoint of the DCI field 'SRS request' may trigger one or more SRS resource set(s).

In case of a downlink DCI, to adapt the minimum applicable value of aperiodic SRS triggering offset for an active UL BWP, the minimum applicable value is determined based on K0_min and K2_min.

In one implementation, the minimum applicable value is determined to be at least max(K0_min, K2_min) respecting required SCS scaling (e.g., for SRS and PDCCH).

In case of an UL DCI, to adapt the minimum applicable value of aperiodic SRS triggering offset for an active UL BWP, the minimum applicable value is determined to be at least K2_min.

This embodiment can be useful e.g., in the case that the UE can apriori determine whether a received DCI is DL DCI or UL DCI (e.g., via different search spaces: some search spaces may be used only for monitoring DL DCI or UL DCI).

In an embodiment, if a group-common DCI (e.g., such as DCI format 2_3) triggers aperiodic SRS, the minimum applicable value of aperiodic SRS triggering offset applies to all serving cells configured by higher layers for which the group common signaling is applicable. In an example, if the corresponding slotOffset parameter associated with the SRS resource set of a triggered SRS of the set of triggered SRSs e.g. via DCI format 2_3 is smaller than the indicated K2_min, that SRS is not transmitted. In another example, having the corresponding slotOffset parameter associated with the SRS resource set of a triggered SRS of the set of triggered SRSs e.g. via DCI format 2_3 smaller than the indicated K2_min is not expected by or not valid for the UE for the aperiodic SRS trigger indication.

According to TS 38.214:

When the UE is configured with the higher layer parameter usage in SRS-ResourceSet set as 'antennaSwitching', the UE may be configured with one of the following configurations depending on the indicated UE capability supportedSRSTxPortSwitch ('t1r2' for 1T2R, 't2r4' for 2T4R, 't1r4' for 1T4R, 't1r4-t2r4' for 1T4R/2T4R, 't1r1' for 1T=1R, 't2r2' for 2T=2R, or 't4r4' for 4T=4R). For 1T=1R, or 2T=2R, or 4T=4R, up to two SRS resource sets each with one SRS resource, where the number of SRS ports for each resource is equal to 1, 2, or 4.

"R" refers to a subset/set of receive antennas for PDSCH; "T" refers to the SRS antennas used for DL CSI acquisition. The indicated UE antennaSwitching capability of 'xTyR' corresponds to a UE, capable of SRS transmission on 'x' antenna ports over total of 'y' antennas, where 'y' corresponds to all or subset of UE receive antennas.

In an embodiment, in case of UE adaptation to the maximum number of MIMO layers via BWP switching (e.g., via configuration of a different MIMO layer configuration of the initial/default BWP compared with other BWPs of a Serving Cell) or via explicit/implicit indication of the maximum number of MIMO layers in a PDCCH-based power saving signal/channel, the number of SRS ports for each SRS resource in an SRS resource set configured with usage 'antennaSwitching' is determined based on the UE capability supportedSRS-TxPortSwitch and the maximum number of MIMO layers for each BWP of the serving cell. For instance, for 4T=4R, up to two SRS resource sets each with one SRS resource, where the number of SRS ports for each resource is equal to W, where W=2 for 4T=4R when the maximum number of MIMO layers for the BWP in which SRS is transmitted is 2 if the performance requirement for the band in which the serving cell operates is met (e.g., operating bands where the UE is required to be equipped with a minimum of two Rx antenna ports), UE is considered to have reduced SRS antenna port switching capability of 2T=2R; otherwise W=4 (e.g., operating bands where the UE is required to be equipped with a minimum of four Rx antenna ports).

Summary of Above Discussed Aspects

1) PHR cut-off time relaxation in case of power saving via cross-slot scheduling.
2) Details of K0_min/K2_min definition (e.g., defined per BWP group) and K0_min/K2_min derivation (e.g., in case of BWP switching).
3) Limitations of power saving via BWP switching (e.g., for maximum MIMO layer adaptation) on a first serving cell in case a second serving cell is configured for URLLC operation.
4) Details of power saving via cross-slot scheduling for aperiodic SRS, including
   - derivation of minimum applicable value of aperiodic SRS triggering offset,
   - determining number of SRS ports in case of antenna switching considering limitations on maximum number of MIMO layers defined for a BWP to enable power saving via adapting maximum number of MIMO layers.

Figure 5:
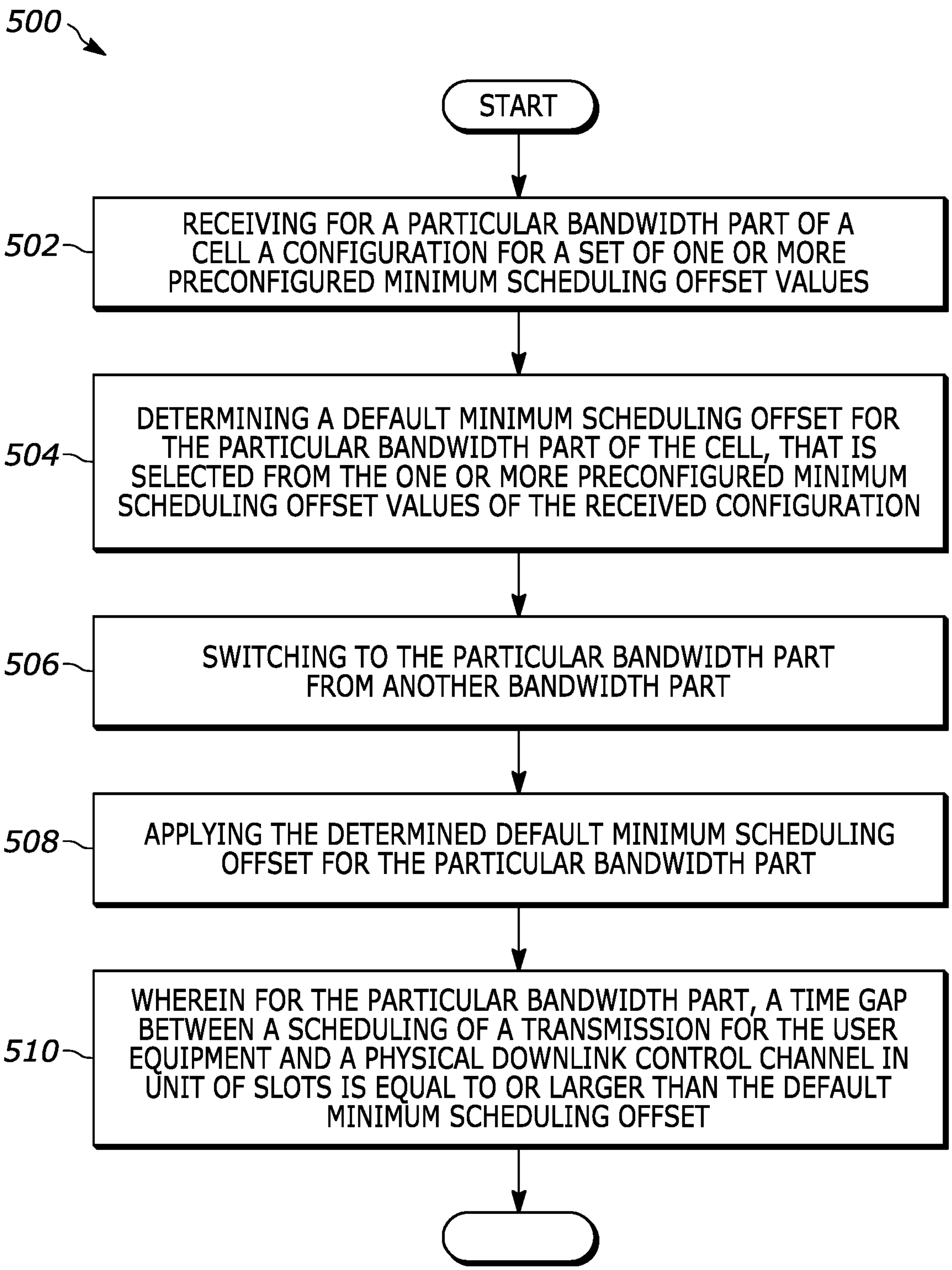
FIG. 5 is a flow diagram in a user equipment for managing a minimum scheduling offset for one or more bandwidth parts.

FIG. 5 illustrates a flow diagram 500 in a user equipment for managing a minimum scheduling offset for one or more bandwidth parts. The method includes receiving 502 for a particular bandwidth part of a cell a configuration for a set of one or more preconfigured minimum scheduling offset values. A default minimum scheduling offset for the particular bandwidth part of the cell, that is selected from the one or more preconfigured minimum scheduling offset values of the received configuration is determined 504. The method further includes switching 506 to the particular bandwidth part from another bandwidth part. The determined default minimum scheduling offset for the particular bandwidth part is applied 508. For the particular bandwidth part, a time gap between a scheduling of a transmission for the user equipment and a physical downlink control channel in unit of slots is equal to or larger than the default minimum scheduling offset 510.

In some instances, determining the default minimum scheduling offset can include receiving a first indication, which identifies a particular one of the one or more preconfigured minimum scheduling offset values of the received configuration to be selected.

In some instances, determining the default minimum scheduling offset can include selecting a minimum scheduling offset value of zero, which indicates that the selected default minimum scheduling offset has no restriction on the time gap between a scheduling of a transmission for the user equipment and a physical downlink control channel.

In some instances, the particular bandwidth part can include one or more corresponding search spaces, and the default minimum scheduling offset determined for the particular bandwidth part can be applicable to at least one of the one or more corresponding search spaces.

In some instances, the particular bandwidth part can include one or more corresponding control resource sets, and the default minimum scheduling offset determined for the particular bandwidth part can be applicable to at least one of the one or more corresponding control resource sets.

In some instances, a bandwidth part, that is different from the particular bandwidth part can have its own default minimum scheduling offset. In some of these instances, the user equipment can receive via a currently associated bandwidth part a downlink control information message, which identifies transmission details associated with a future transmission. Further, the transmission details identified with the received downlink control information message can include an indication that the future transmission will be associated with a new target bandwidth part different from the currently associated bandwidth part, and the minimum scheduling offset to be used with the future transmission can be the minimum scheduling offset associated with the currently associated bandwidth part via which the downlink control information message associated with the future transmission was received.

In some instances, the determining the default minimum scheduling offset for the particular bandwidth part of the cell can include determining a “K0-min” value for a DL minimum scheduling offset and a “K2-min” value for an UL minimum scheduling offset, which are each respectively associated with the particular bandwidth part of the cell. In some of these instances, at least a first one of either a K0_min value or a K2_min value can be determined for a first one of either a search space or a control resource set associated with the particular bandwidth part, and a second one of either a K0_min value or a K2_min value can be determined for at least a second one of either a search space or a control resource set associated with the particular bandwidth part.

In some instances, the default minimum scheduling offset for the particular bandwidth part can be a first minimum scheduling offset, when the particular bandwidth part belongs to a first group of bandwidth parts, and the default minimum scheduling offset for the particular bandwidth part can be a second minimum scheduling offset, when the particular bandwidth part belongs to a second group of bandwidth parts. In some of these instances, the first group of bandwidth parts can include the another bandwidth part from which the user equipment is switched.

In some instances, the transmission can be a downlink transmission. In some of these instances, the method can further include receiving on the particular bandwidth part an indication, which schedules a second transmission on the particular bandwidth part, wherein no minimum scheduling offset value can have been selected relative to the second transmission prior to receiving the indication, which schedules the second transmission on the particular bandwidth part, and wherein the determined default minimum scheduling offset can be used for the second transmission.

In some instances, the transmission can be an uplink transmission. In some of these instances, the method can further include receiving a plurality of configurations, each configuration associated with a respective one of multiple cells for physical uplink shared channel transmissions. A determination can then be made as to whether a power headroom report is triggered. A first indication can then be received, that indicates the minimum value of a scheduling offset associated with an uplink transmission “K2-min” for a first serving cell, and the power headroom report can be computed based on a first transmission and a second transmission. The power headroom report can then be reported in a first physical uplink shared channel. The first physical uplink shared channel transmission can include an initial transmission of transport block on an active uplink bandwidth part of a first carrier of the first serving cell, and a second physical uplink shared channel transmission on an active uplink bandwidth part of a second carrier of a second serving cell, can overlap with the first physical uplink shared channel transmission. The second physical uplink shared channel transmission can be scheduled by a downlink control information format in a physical downlink control channel received in a second physical downlink control channel monitoring occasion. The second physical downlink control channel monitoring occasion is not later than an offset “W” to a first physical downlink control channel monitoring occasion where the user equipment can detect the earliest downlink control information format scheduling the first physical uplink shared channel after the power headroom report was triggered, where the offset “W” can be based on the first indication.

In some instances, the method can further include receiving a first multiple input multiple output configuration including a first maximum number of multiple input multiple output layers for a first set of bandwidth parts of a first serving cell. A second multiple input multiple output configuration including a second maximum number of multiple input multiple output layers can be received for a second set of bandwidth parts of the first serving cell. A configuration enabling an ultra reliable low latency communication operation on a second serving cell can be received. An indication on a first bandwidth part of the first set of bandwidth parts can be received, where the indication schedules a downlink transmission on a second bandwidth part of the second set of bandwidth parts, when the bandwidth part switching does not cause interruption to ultra-reliable low-latency communication on the second serving cell.

In some instances, the method can include receiving a sounding reference signal configuration, including a slot-offset parameter associated with a sounding reference signal resource set, where the slot-offset parameter can indicate the number of slots between the sounding reference signal request and the corresponding sounding reference signal transmission. A first value of minimum scheduling offset associated with uplink transmissions, referred to as K2-min value can be received. A sounding reference signal transmission request associated with the sounding reference signal resource set can be received. The sounding reference signal transmission in the sounding reference signal resource set can then be skipped, when the corresponding slot-offset parameter associated with the sounding reference signal resource set is smaller than the K2-min, and the sounding reference signal transmission in the sounding reference signal resource set can be transmitted, when the corresponding slot-offset parameter associated with the sounding reference signal resource set is not smaller than the K2-min.

Figure 6:
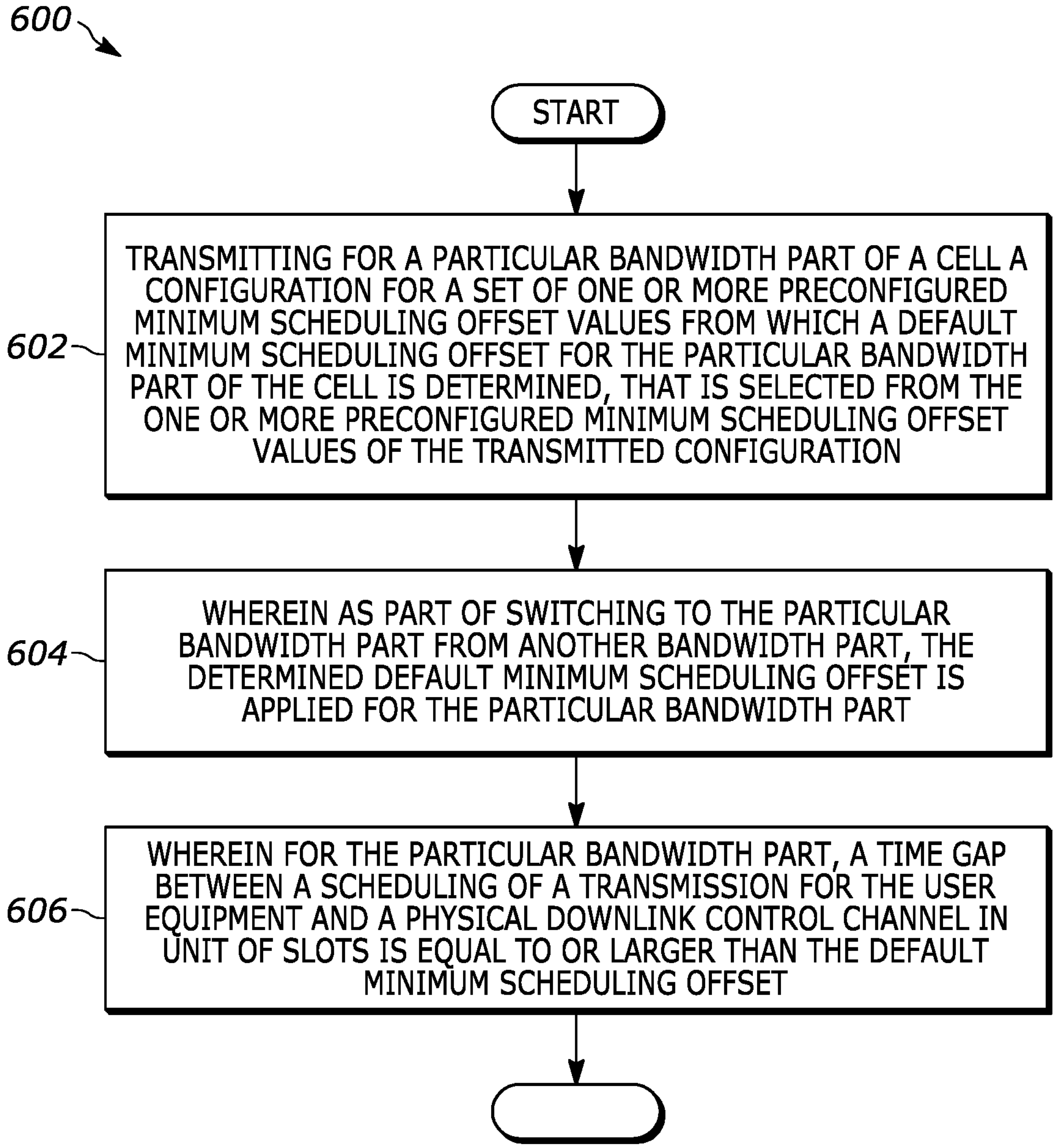
FIG. 6 is a flow diagram in a network entity for managing a minimum scheduling offset for one or more bandwidth parts.

FIG. 6 illustrates a flow diagram 600 in a network entity for managing a minimum scheduling offset for one or more bandwidth parts. The method includes transmitting 602 for a particular bandwidth part of a cell a configuration for a set of one or more preconfigured minimum scheduling offset values from which a default minimum scheduling offset for the particular bandwidth part of the cell is determined, that is selected from the one or more preconfigured minimum scheduling offset values of the transmitted configuration. As part of switching to the particular bandwidth part from another bandwidth part, the determined default minimum scheduling offset is applied for the particular bandwidth part 604. For the particular bandwidth part, a time gap between a scheduling of a transmission for the user equipment and a physical downlink control channel in unit of slots is equal to or larger than the default minimum scheduling offset 606.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
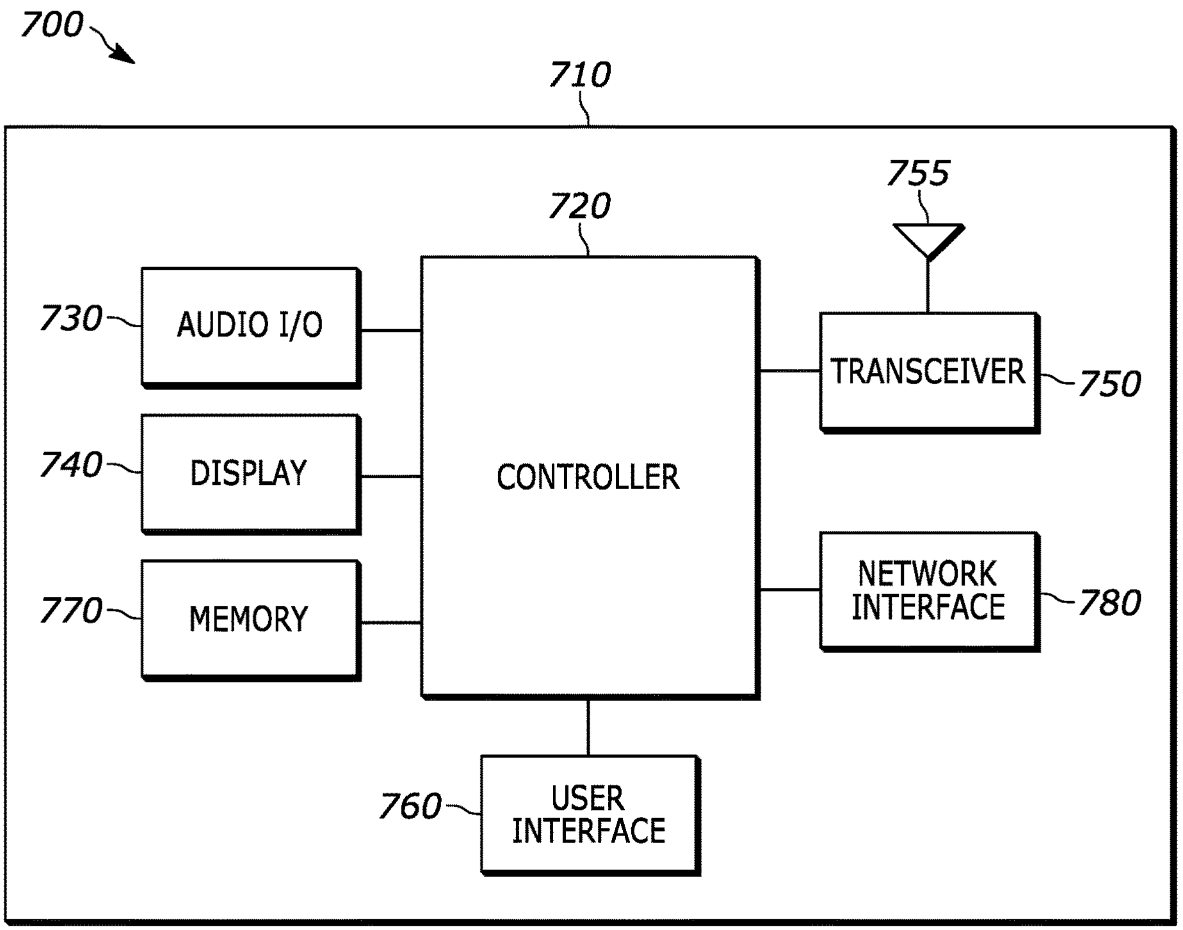
FIG. 7 is an example block diagram of an apparatus according to a possible embodiment.

FIG. 7 is an example block diagram of an apparatus 700, such as the wireless communication device 110, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments.

The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random access memory, a read only memory, an optical memory, a solid state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:

receiving a configuration for a first default minimum scheduling offset for a first bandwidth part (BWP) of a cell;

applying the first default minimum scheduling offset for the first BWP;

switching to a second BWP of the cell from the first BWP;

applying, in response to failing to receive a minimum scheduling offset value in control information after switching to the second BWP, a minimum scheduling offset for the second BWP, wherein the minimum scheduling offset for the second BWP corresponds to a default value from a set of minimum scheduling offset values configured for the second BWP; and receiving a downlink shared channel transmission a numerical quantity of slots after a physical downlink control channel (PDCCH), wherein the numerical quantity of slots is equal to or greater than the minimum scheduling offset for the second BWP.

2. The method of claim 1, wherein the configuration identifies at least one of the first default minimum scheduling offset or a second default minimum scheduling offset for the second BWP of the cell from the set of minimum scheduling offset values.

3. The method of claim 1, wherein a second default minimum scheduling offset for the second BWP of the cell is zero, and wherein the numerical quantity of slots is unrestricted based at least in part on the second default minimum scheduling offset being zero.

4. The method of claim 1, wherein the second BWP comprises one or more search spaces, and wherein the minimum scheduling offset for the second BWP is applicable to the one or more search spaces.

5. The method of claim 1, wherein the second BWP comprises one or more control resource sets (CORESETs), and wherein the minimum scheduling offset for the second BWP is applicable to the one or more CORESETs.

6. The method of claim 1, wherein the first default minimum scheduling offset is different from a second default minimum scheduling offset for the second BWP of the cell.

7. The method of claim 6, further comprising receiving, via the first BWP, downlink control information (DCI) that indicates a future transmission is associated with the second BWP, wherein an additional minimum scheduling offset value associated with the future transmission is a same value as the first default minimum scheduling offset.

8. The method of claim 1, further comprising determining a "K0-min" value for a downlink minimum scheduling offset associated with the second BWP and a "K2-min" value for an uplink minimum scheduling offset associated with the second BWP, wherein a second default minimum scheduling offset for the second BWP of the cell is based at least in part on the "K0-min" value and the "K2-min" value.

9. The method of claim 8, wherein the "K0-min" value is determined for a search space or a control resource set (CORESET) associated with the second BWP, and wherein the "K2-min" value is determined for the search space or the CORESET associated with the second BWP.

10. The method of claim 1, further comprising receiving, via the second BWP, an indication that schedules a transmission on the second BWP, wherein no additional minimum scheduling offset is selected relative to the transmission prior to receiving the indication, and wherein a second default minimum scheduling offset for the second BWP of the cell is used for the transmission.

11. The method of claim 1, further comprising:

determining a power headroom (PHR) report is triggered;

receiving an indication of a minimum value of a scheduling offset associated with a first serving cell;

computing the PHR report based at least in part on a first transmission and a second transmission; and transmitting the PHR report in a first physical uplink shared channel (PUSCH) transmission, wherein:

the first PUSCH transmission comprises an initial transmission of a transport block (TB) on an active uplink BWP of a first carrier of the first serving cell;

a second PUSCH transmission on an active uplink BWP of a second carrier of a second serving cell overlaps with the first PUSCH transmission;

the second PUSCH transmission is scheduled by downlink control information (DCI) received in a second PDCCH monitoring occasion;

the second PDCCH monitoring occasion is separated by an offset from a first PDCCH monitoring occasion comprising an earliest DCI scheduling the first PUSCH transmission after the PHR report was triggered; and the offset is based at least in part on the minimum value of the scheduling offset associated with the first serving cell.

12. The method of claim 1, further comprising:

receiving a first multiple input multiple output (MIMO) configuration comprising a maximum number of MIMO layers for a first set of BWPs of a first serving cell;

receiving a second MIMO configuration comprising a maximum number of MIMO layers for a second set of BWPs of the first serving cell;

receiving an additional configuration enabling an ultra reliable low latency (URLLC) communication operation on a second serving cell; and receiving an indication on a BWP of the first set of BWPs, wherein the indication schedules a downlink transmission on a BWP of the second set of BWPs, and wherein the BWP switching does not cause interruption to URLLC communication on the second serving cell.

13. The method of claim 1, further comprising:

receiving a sounding reference signal (SRS) configuration comprising a slot-offset parameter associated with an SRS resource set, wherein the slot-offset parameter indicates an additional numerical quantity of slots between an SRS request and an SRS transmission;

receiving a value of an additional minimum scheduling offset associated with uplink transmissions;

receiving the SRS request associated with the SRS resource set; and canceling the SRS transmission in the SRS resource set based at least in part on the slot-offset parameter associated with the SRS resource set being smaller than the value of the additional minimum scheduling offset; or transmitting the SRS transmission in the SRS resource set based at least in part on the slot-offset parameter associated with the SRS resource set being greater than or equal to the value of the additional minimum scheduling offset.

14. A user equipment (UE) for wireless communication, comprising:

at least one memory; and at least one processor coupled with the at least one memory and operable to cause the UE to:

receive a configuration for a first default minimum scheduling offset for a first bandwidth part (BWP) of a cell;

apply the first default minimum scheduling offset for the first BWP;

switch to a second BWP of the cell from the first BWP;

apply, in response to failing to receive a minimum scheduling offset value in control information after switching to the second BWP, a minimum scheduling offset for the second BWP, wherein the minimum scheduling offset for the second BWP corresponds to a default value from a set of minimum scheduling offset values configured for the second BWP; and receive a downlink shared channel transmission a numerical quantity of slots after a physical downlink control channel (PDCCH), wherein the numerical quantity of slots is equal to or greater than the minimum scheduling offset for the second BWP.

15. The UE of claim 14, wherein the at least one processor is further configured to cause the UE to receive, via the second BWP, an indication that schedules a transmission on the second BWP, wherein no additional minimum scheduling offset is selected relative to the transmission prior to receiving the indication, and wherein a second default minimum scheduling offset for the second BWP of the cell is used for the transmission.

16. The UE of claim 14, wherein the at least one processor is further configured to cause the UE to:

receive a first multiple input multiple output (MIMO) configuration comprising a maximum number of MIMO layers for a first set of BWPs of a first serving cell;

receive a second MIMO configuration comprising a maximum number of MIMO layers for a second set of BWPs of the first serving cell;

receive an additional configuration enabling an ultra reliable low latency (URLLC) communication operation on a second serving cell; and receive an indication on a BWP of the first set of BWPs, wherein the indication schedules a downlink transmission on a BWP of the second set of BWPs, and wherein the BWP switching does not cause interruption to URLLC communication on the second serving cell.

17. The UE of claim 14, wherein the at least one processor is further configured to cause the UE to:

receive a sounding reference signal (SRS) configuration comprising a slot-offset parameter associated with an SRS resource set, wherein the slot-offset parameter indicates an additional numerical quantity of slots between an SRS request and an SRS transmission;

receive a value of an additional minimum scheduling offset associated with uplink transmissions;

receive the SRS request associated with the SRS resource set; and cancel the SRS transmission in the SRS resource set based at least in part on the slot-offset parameter associated with the SRS resource set being smaller than the value of the additional minimum scheduling offset; or transmit the SRS transmission in the SRS resource set based at least in part on the slot-offset parameter associated with the SRS resource set being greater than or equal to the value of the additional minimum scheduling offset.

18. A method performed by a network equipment (NE), the method comprising:

transmitting a configuration for a first default minimum scheduling offset for a first bandwidth part (BWP) of a cell;

applying the first default minimum scheduling offset for the first BWP;

switching to a second BWP of the cell from the first BWP;

applying, in response to failing to transmit a minimum scheduling offset value in control information after switching to the second BWP, a minimum scheduling offset for the second BWP, wherein the minimum scheduling offset for the second BWP corresponds to a default value from a set of minimum scheduling offset values configured for the second BWP; and transmitting a downlink shared channel transmission a numerical quantity of slots after a physical downlink control channel (PDCCH), wherein the numerical quantity of slots is equal to or greater than the minimum scheduling offset for the second BWP.

19. A network equipment (NE) for wireless communication, comprising:

at least one memory; and at least one processor coupled with the at least one memory and configured to cause the NE to:

transmit a configuration for a first default minimum scheduling offset for a first bandwidth part (BWP) of a cell;

apply the first default minimum scheduling offset for the first BWP;

switch to a second BWP of the cell from the first BWP;

apply, in response to failing to transmit a minimum scheduling offset value in control information after switching to the second BWP, a minimum scheduling offset for the second BWP, wherein the minimum scheduling offset for the second BWP corresponds to a default value from a set of minimum scheduling offset values configured for the second BWP; and transmit a downlink shared channel transmission a numerical quantity of slots after a physical downlink control channel (PDCCH), wherein the numerical quantity of slots is equal to or greater than the minimum scheduling offset for the second BWP.

20. The NE of claim 19, wherein the configuration identifies at least one of the first default minimum scheduling offset or a second default minimum scheduling offset for the second BWP of the cell from the set of minimum scheduling offset values.

* * * * *